(12) United States Patent
Tadokoro et al.

(10) Patent No.: US 7,904,572 B2
(45) Date of Patent: Mar. 8, 2011

(54) METHOD, APPARATUS, AND MEDIUM FOR CONTROLLING ACCESS TO AND SETTING FOR FEATURES OF AN IMAGING PROCESSING DEVICE

(75) Inventors: Shigeru Tadokoro, Saitama (JP); Satomi Yotsuyanagi, Kawasaki (JP)

(73) Assignee: Canon Denshi Kabushiki Kaisha, Chichibu-shi, Saitama-ken (JP)

( * ) Notice: Subject to any disclaimer, the term of this patent is extended or adjusted under 35 U.S.C. 154(b) by 605 days.

(21) Appl. No.: 11/934,740

(22) Filed: Nov. 2, 2007

(65) Prior Publication Data

US 2008/0114903 A1   May 15, 2008

(30) Foreign Application Priority Data

Nov. 10, 2006  (JP) .................................. 2006-305801
Dec. 14, 2006  (JP) .................................. 2006-337005

(51) Int. Cl.
*G06F 21/20*   (2006.01)
*G06F 21/22*   (2006.01)

(52) U.S. Cl. ............... 709/229; 726/4; 726/19; 717/121; 705/26; 382/187; 710/8

(58) Field of Classification Search .................. 709/229, 709/220–222
See application file for complete search history.

(56) References Cited

U.S. PATENT DOCUMENTS

| | | | | |
|---|---|---|---|---|
| 6,697,524 | B1 * | 2/2004 | Arai et al. ...................... | 382/187 |
| 6,745,334 | B1 * | 6/2004 | Ikegami .......................... | 726/19 |
| 2003/0083954 | A1 * | 5/2003 | Namba ........................... | 705/26 |
| 2007/0168965 | A1 * | 7/2007 | Zenz et al. ..................... | 717/121 |

FOREIGN PATENT DOCUMENTS

| | | |
|---|---|---|
| JP | 10149061 | 6/1998 |
| JP | 2001306204 | 11/2001 |

* cited by examiner

*Primary Examiner* — Ashok B Patel
*Assistant Examiner* — Andrew Goldberg
(74) *Attorney, Agent, or Firm* — Fitzpatrick, Cella, Harper & Scinto

(57) ABSTRACT

An image processing apparatus which can be readily used by an authenticated user without laborsome setting even if the user uses the image processing apparatus for the first time through an authentication server. A user is authenticated with an authentication server connected to an image processing apparatus via a network. User unique setting information for the authenticated user is set, and the user unique setting information for each user is stored in user information storing areas. Initial setting information of initial setting of the image processing apparatus is stored in an initial setting information storing area. When the authenticated user uses the image processing apparatus for the first time, duplicate copy of the initial setting information stored in the initial setting information storing area is stored as the user unique setting information in the user information storing areas.

7 Claims, 16 Drawing Sheets

☒ PERMIT USE OF ADDRESS BOOK A
☒ PERMIT EDIT OF ADDRESS BOOK A
☒ PERMIT USE OF ADDRESS BOOK B
☒ PERMIT EDIT OF ADDRESS BOOK B

☒ PERMIT USE OF ADDRESS BOOK A
☐ PERMIT EDIT OF ADDRESS BOOK A
☐ PERMIT USE OF ADDRESS BOOK B
☐ PERMIT EDIT OF ADDRESS BOOK B

METHOD, APPARATUS, AND MEDIUM FOR CONTROLLING ACCESS TO AND SETTING FOR FEATURES OF AN IMAGING PROCESSING DEVICE

BACKGROUND OF THE INVENTION

1. Field of the Invention

The present invention relates to an image processing apparatus, an control method for the image processing apparatus, a program for implementing the control method, and a storage medium storing the program, and more particularly, the present invention relates to an image processing apparatus and an image processing method that includes a first operation mode for every user and a second operation mode for authenticated users and can manage a plurality of users, a program for implementing the control method, and a storage medium storing the program.

2. Description of the Related Art

Conventionally, a plurality of users who use a plurality of personal computers (hereinafter, referred to as "PCs") connected to a network have shared an image processing apparatus (a network resource) such as a scanner, a FAX, a printer, a copying machine or the like. In such a system, general users can easily share the image processing apparatus.

In order to ensure the security in an office, a technique has been proposed to perform user management for an image processing apparatus and to perform the user authentication to identify a current operator of the image processing apparatus.

In recent years, further enhancement of the security is emphasized. For this purpose, a technique has been proposed to manage operating environment setting of an image processing apparatus for each authenticated user (for example, see Japanese Laid-Open Patent Publication (Kokai) No. 2001-306204 and Japanese Laid-Open Patent Publication (Kokai) No. 10-149061).

However, when a kind of image processing apparatus that can be naturally shared is upgraded to a device embedded with security functions such as the above described user management and user authentication, or when an image processing apparatus already embedded with the security functions is newly purchased and introduced to an office, an administrator of the image processing apparatus needs to perform necessary setting over numerous items with efforts, hence the administrator must perform heavy labor.

Since a user cannot use an image processing apparatus until setting for all users is completed, users who share the image processing apparatus feel inconvenience. This is because a user generally gives priority to convenience rather than high security and feels a waste of time even for the setting.

Further, the inconvenience as described above causes prevention of the new introduction of the image processing apparatus embedded with the security functions to an office.

A shared network scanner connected to a network includes a PULL type scanner for which a PC performs scan setting to set the reading resolution or the size of an original to be read and causes the scanner to scan the original fed to the scanner, and a PUSH type scanner for which the scanner performs the scan setting and the scanning.

Some PUSH type scanners that can store only a scan parameter always return to default scan setting whenever each user starts using such a scanner. Alternatively, a user may have to perform his/her own scan setting again each time he/she uses the scanners since the scanners store scan setting changed by another user.

An image processing apparatus having plurality of functions such as sending e-mail, saving file or printing takes security measures to prevent leakage of confidential information. That is, in such a device, it is preferred that setting can be changed for each user to restrict a user to only use functions available to the user and to permit the user to perform minimum operations necessary for his/her work. Thus, in order to reduce a labor to set scan parameters again as above and prevent the leakage of confidential information, it is required to manage setting information for individual user.

Meanwhile, in an image processing apparatus for managing setting information for each user, an administrator needs to register a new user in the device to permit the user to use the device. In order to strictly control the security, the administrator restricts the use of functions of the device for each user. For example, techniques have been disclosed for an administrator to perform user authentication and manage operating environment setting for each user (for example, see Japanese Laid-Open Patent Publication (Kokai) No. 10-149061 and Japanese Laid-Open Patent Publication (Kokai) No. 2001-306204).

A method of separately managing setting information for each user includes a method for an administrator to previously register all users who possibly use an image processing apparatus, and previously store the setting information for each user in a storage device or a memory in the image processing apparatus.

Instead of setting functional restrictions for each user, the functional restrictions can be provided for each image processing apparatus so that the identical functional restrictions are set for all users who use an image processing apparatus.

However, the image processing apparatus for managing the setting information for each user often applies the same setting to users who do the same work or belong to the same division. In this case, if initial setting information such as default scan parameters of the device cannot be changed, an administrator must perform setting based on the default initial setting information for each time of registration in spite of that the same setting information is set for many users. As described, if there are many users to be registered, a great burden is put on an administrator.

Additionally, the method of previously storing the setting information for each user in the storage device in the above described image processing apparatus has the following problems.

For example, there is a system in which an authentication server and a plurality of image processing apparatuses are connected to one another via a network, ten thousands of users are registered in a storage device in the authentication server (e.g., in Microsoft Active Directory), and the users who use the image processing apparatus are authenticated using user IDs and passwords. The image processing apparatus can restrict functions for each user, and all the users are permitted to use the image processing apparatus with functional restrictions depending on their work. Suppose that the number of users who use one image processing apparatus is about ten and that the system employs a method of registering all the users who possibly use the device in the image processing apparatus, and previously storing setting information for each registered users in the image processing apparatus. Then, user information of the ten thousands of users registered in the authentication server and ten thousand user setting information must be stored in a memory in the image processing apparatus.

But actually, an image processing apparatus cannot be provided with a high-capacity memory or the like for storing the user information and user setting information of ten thousands of users. Additionally, much of the stored user setting information is user setting information of users who do not use the device, hence storing areas of the memory or the like are wasted.

In the image processing apparatus described in the above that sets the identical functional restrictions for all users who use an image processing apparatus, it is not possible to change functional restriction setting only for a certain authenticated user. Using such an image processing apparatus, it might impossible to give the right of use only to a certain user and a user cannot use functions if the user desires so.

SUMMARY OF THE INVENTION

The present invention provides an image processing apparatus, a control method for controlling the image processing apparatus, a program for implementing the control method, and a storage medium storing the program which can be readily used by an authenticated user without laborsome setting even if the user uses the image processing apparatus for the first time through an authentication server.

The present invention also provides an image processing apparatus, a control method for controlling the image processing apparatus, a program for implementing the control method, and a storage medium storing the program that can improve usability even if the device has a function such as a security function requiring to switch and manage setting data for each user.

In a first aspect of the present invention, there is provided an image processing apparatus comprising an authenticating unit adapted to authenticate a user with an authentication server connected thereto via a network, a user setting information setting unit adapted to set user unique setting information for the authenticated user, a user setting information storage unit adapted to store the user unique setting information for each user, an initial setting information storage unit adapted to store initial setting information of the image processing apparatus, and an initial setting information duplicating unit adapted to store duplicate copy of the initial setting information stored in the initial setting information storage unit as the user unique setting information in the user setting information storage unit when the authenticated user uses the image processing apparatus for the first time.

According to the present invention, when an authenticated user uses the image processing apparatus for the first time through the authentication server, duplicate copy of initial setting information stored in an initial setting information storage unit is stored as user unique setting information in a user setting information storage unit. Therefore, it is possible for the user to readily use the image processing apparatus based on the initial setting information being previously set by an administrator without laborsome setting even if the authenticated user uses the image processing apparatus for the first time through the authentication server.

In a second aspect of the present invention, there is provided an image processing apparatus that has a first operation mode in which every user can use the image processing apparatus and a second operation mode in which authenticated users are allowed to use the image processing apparatus, and can be shared by a plurality of users, the apparatus comprising a storage unit adapted to store first setting information exclusively used by each authenticated user, second setting information including a setting item same as at least one setting item of the first setting information and shared by at least some of the authenticated users, and third setting information including a setting item same as at least one setting item of the first setting information and shared by the every user, and a data switching unit adapted to switch data between the second setting information and the third setting information depending on alteration of operation mode to the first operation mode or the second operation mode.

According to the present invention, data is switched between second setting information shared by authenticated users and third setting information shared by every user depending on an operation mode. In other words, depending on whether an operation mode of the image processing apparatus is in a first operation mode for every user or a second operation mode for authenticated users, at least the second and third setting information among the first to third setting information is automatically employed flexibly. As such, it is possible for a user to save labor required both setting of the first operation mode and setting of the second operation mode of the image processing apparatus. Therefore, the present invention can provide a user-friendly image processing apparatus newly added with a data switching function for the operation mode switching. Additionally, new introduction of office equipment to an office can be facilitated.

Further features and advantages of the present invention will become apparent from the following detailed description of exemplary embodiments with reference to the attached drawings.

BRIEF DESCRIPTION OF THE DRAWINGS

FIG. 7A is a diagram showing one setting example of a setting screen when functional restrictions on the initial setting information are reduced; and FIG. 7B is a diagram showing one example of the setting screen when some of functional restrictions on the initial setting information remain restricted.

DETAILED DESCRIPTION OF THE PREFERRED EMBODIMENTS

The present invention will now be described in detail with reference to the drawings showing preferred embodiments thereof.

Figure 1:
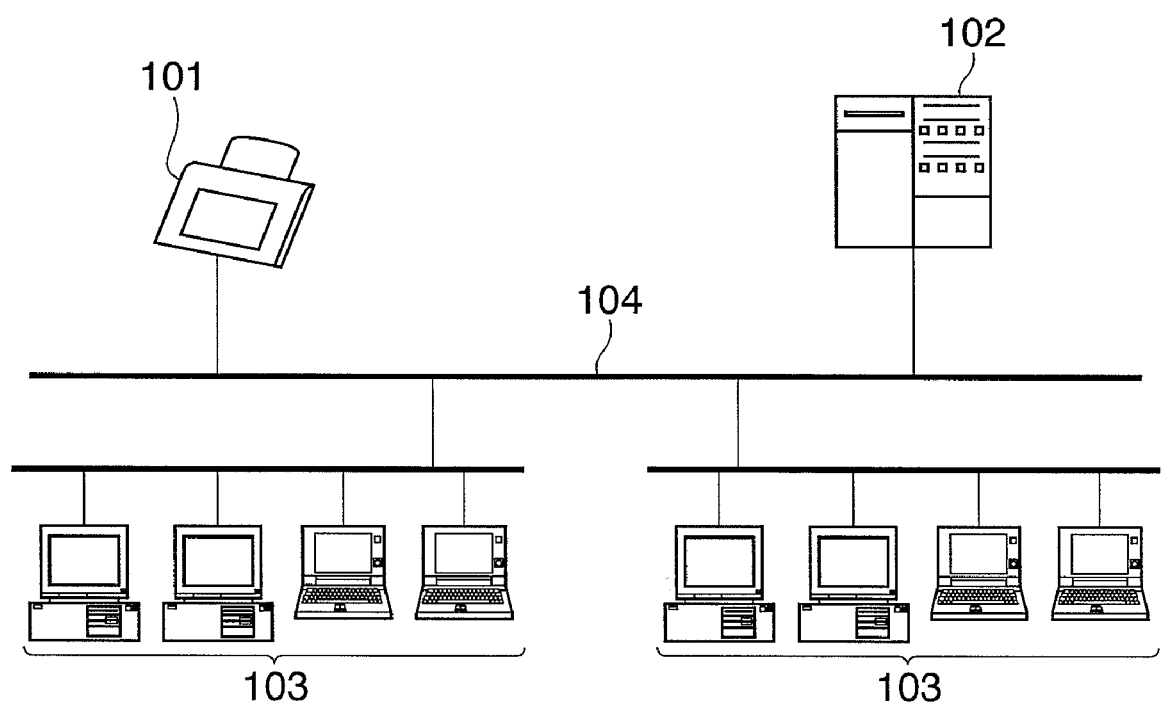
FIG. 1 is a diagram showing overall configuration of a system comprising an image processing apparatus according to a first embodiment of the present invention.

FIG. 1 is a diagram showing overall configuration of a system comprising an image processing apparatus (image reading device) according to a first embodiment of the present invention.

In FIG. 1, an image processing apparatus 101 has a plurality of functions such as an image reading function, sending e-mail, FTP (File Transfer Protocol) transmission or sending file. The image processing apparatus 101 is connected to an authentication server 102 and a plurality of user PCs 103 via a network 104.

Figure 2:
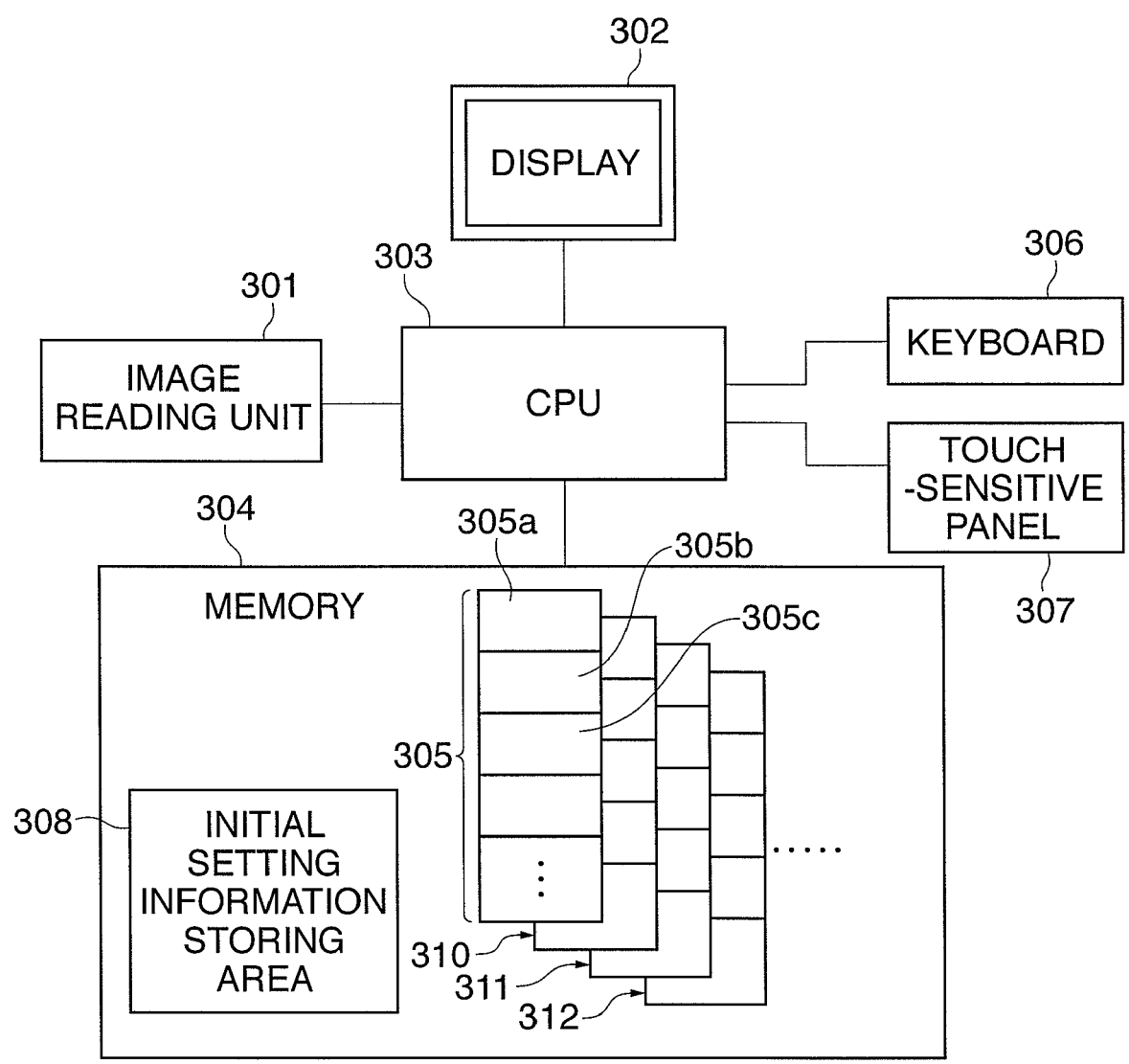
FIG. 2 is a block diagram showing schematic configuration of the image processing apparatus in FIG. 1.

FIG. 2 is a block diagram showing schematic configuration of the image processing apparatus 101 in FIG. 1.

In FIG. 2, the image processing apparatus 101 is comprised of a CPU 303 as a control unit, a display 302 for displaying an operation screen, a keyboard 306 and a touch-sensitive panel 307 for an operator to direct an operation, an image reading unit 301 for reading an image from an original, and a memory 304 as a rewritable storage unit. The display 302, the keyboard 306, the touch-sensitive panel 307, the image reading unit 301 and the memory 304 are connected to the CPU 303.

In the memory 304, there are user information storing areas 305, 310, 311 and 312 that are allocated as user management areas for users and store each of user unique setting information, and an initial setting information storing area 308 that stores initial setting information of the image processing apparatus.

Each of the user information storing areas 305, 310, 311 and 312 stores as user unique setting information: a user information ID for identifying each user information storing area; image reading condition information such as a path designating read image data storage device, the resolution, a reading mode, a file format of image data or the size of an original; and functional restriction information to determine whether the user is permitted or prohibited to use a print function or a sending e-mail function or to use an address book. For example, the user information storing area 305 stores a user information ID in an area 305a, stores image reading condition information in an area 305b, and stores functional restriction information in an area 305c.

Meanwhile, the initial setting information storing area 308 stores initial setting information such as image reading condition information and functional restriction information that have been previously stored or previously set by an administrator when a device is introduced.

When a new user uses the image processing apparatus 101 for the first time, a new user information storing area is allocated for the new user in the memory 304. For this purpose, memory areas to allocate new user information storing areas are previously reserved in the memory 304 in order to support increased users. The image processing apparatus 101 may be configured so that volume of the reserved memory areas (capacity) can be automatically varied depending on the number of user information storing areas. Alternatively, the maximum number of user information storing areas that can be saved in the memory 304 can be properly changed.

Figure 3:
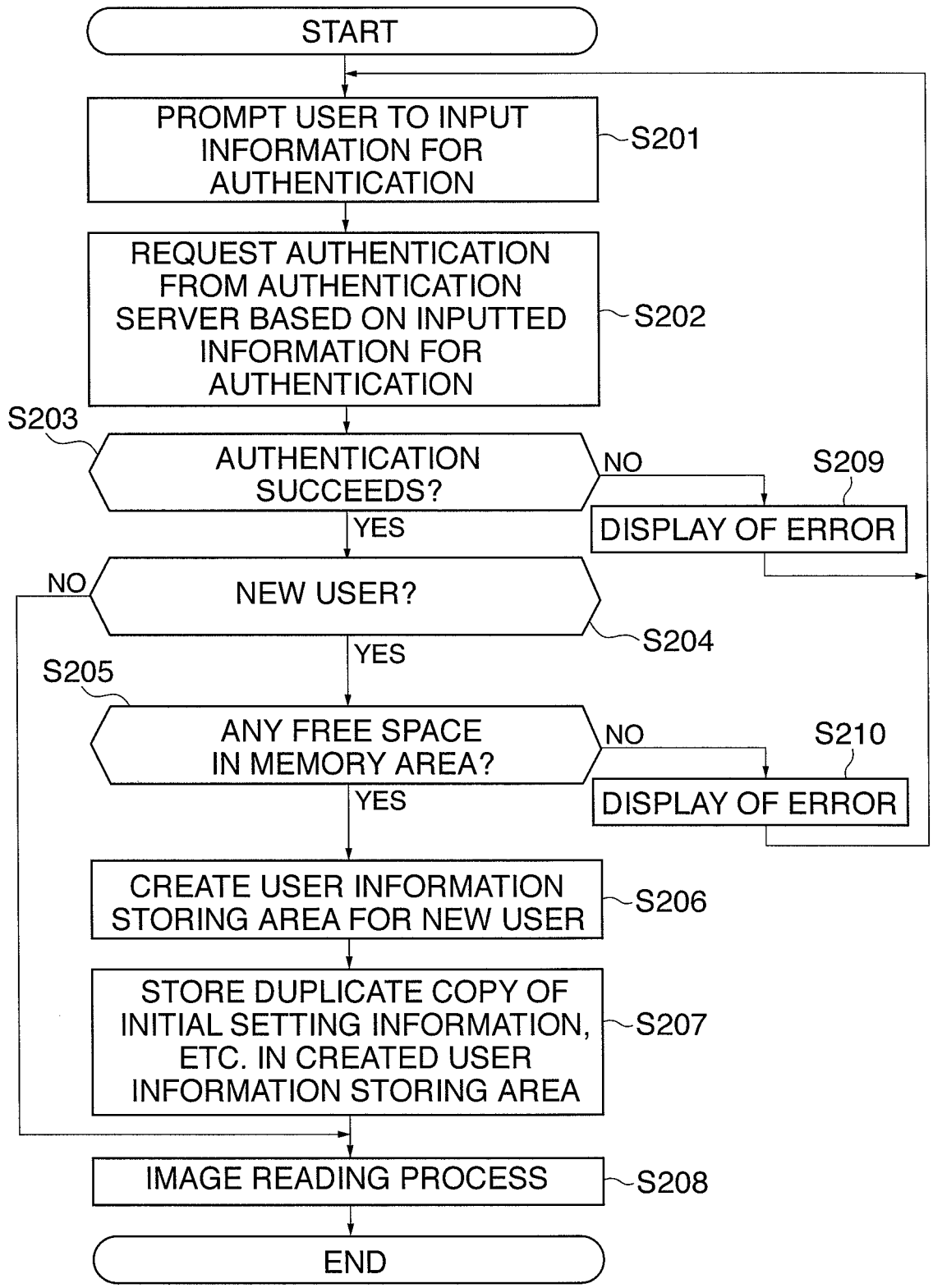
FIG. 3 is a flowchart of user authentication processing executed before image reading process in the image processing apparatus in FIG. 1.
Figure 4:
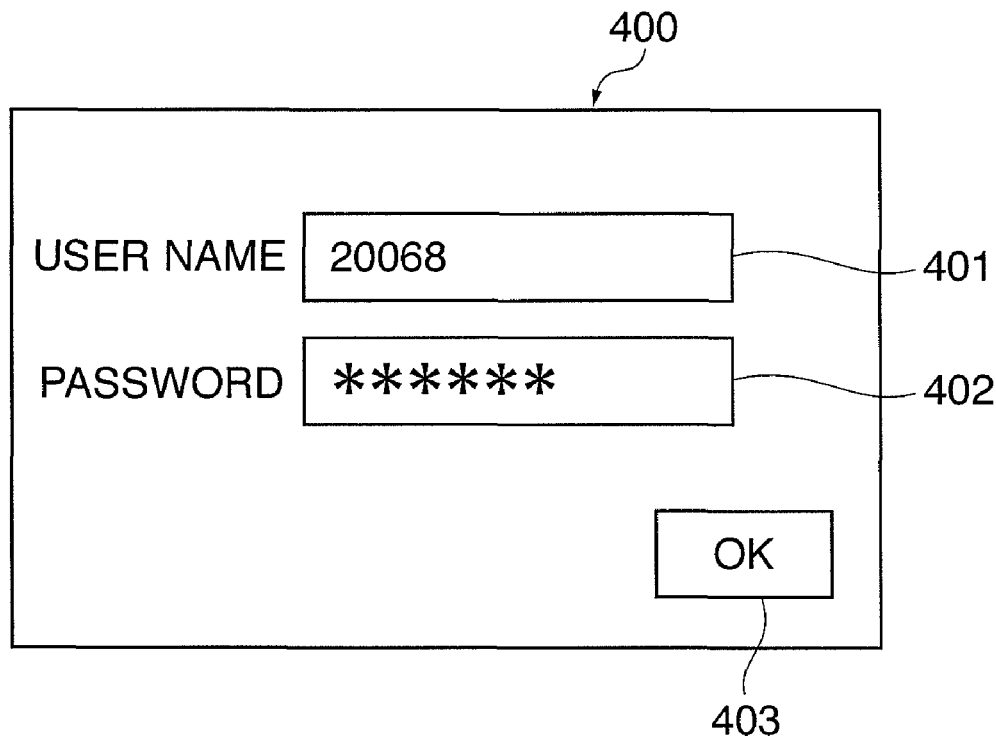
FIG. 4 is a diagram showing one example of an initial screen displayed on a display in FIG. 2.
Figure 5:
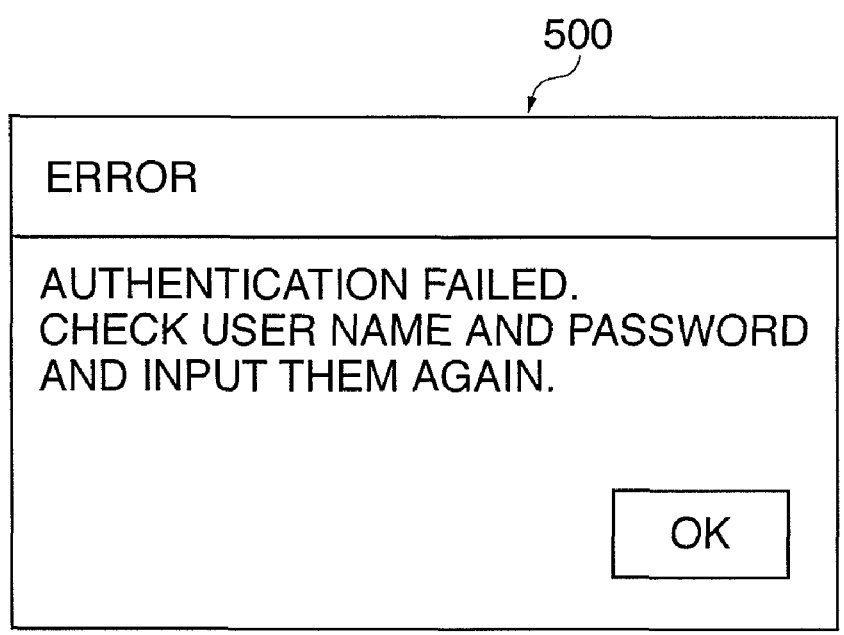
FIG. 5 is a diagram showing one example of an error message screen displayed at the failure of authentication.
Figure 6:
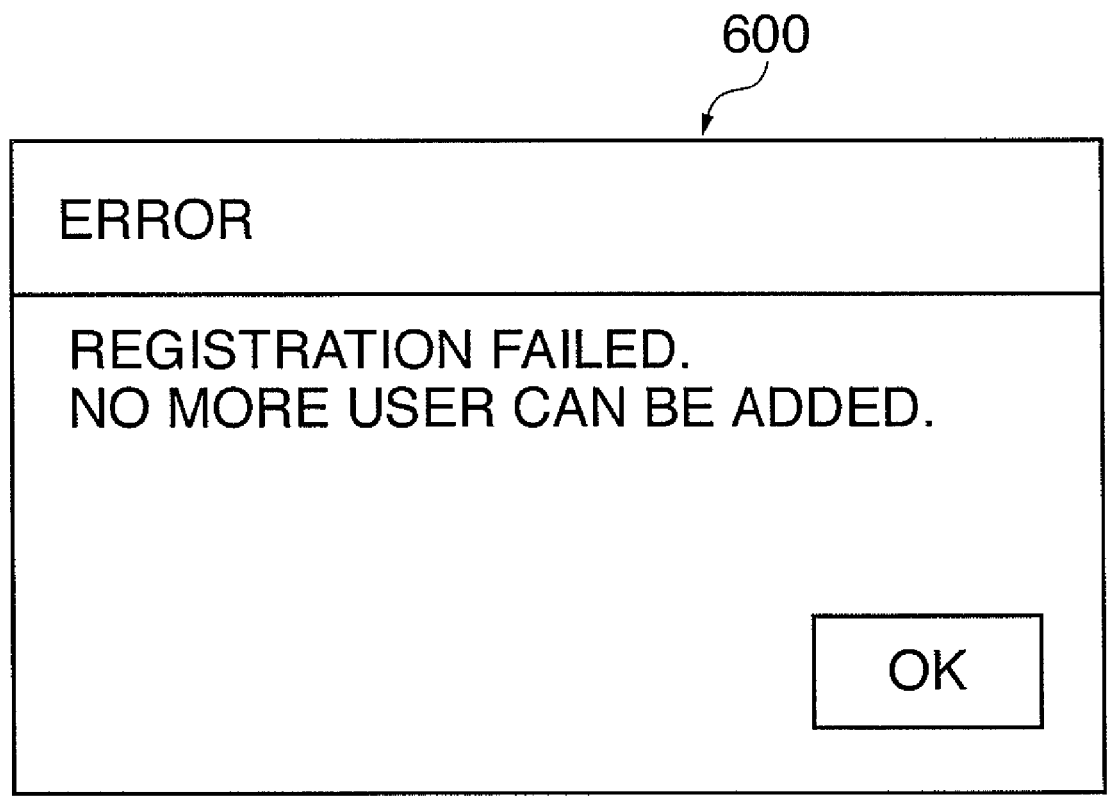
FIG. 6 is a diagram showing one example of an error screen displayed at a user registration error.

FIG. 3 is a flowchart of user authentication process and additional user registration process executed in the image processing apparatus 101 in FIG. 1 before image reading process. FIG. 4 is a diagram showing one example of a login screen first displayed on the display 302 in FIG. 2 when each user starts the operation. FIG. 5 is a diagram showing one example of an error message screen displayed at the failure of authentication. FIG. 6 is a diagram showing one example of an error screen displayed at a registration error. The CPU 303 in the image processing apparatus 101 executes the process in FIG. 3 through the control of the respective units of the image processing apparatus 101. A user of the image processing apparatus 101 cannot use the image processing apparatus unless the image processing apparatus 101 sends user information for authentication to the authentication server 102 and user authentication executed by the authentication server 102 is completed.

In step S201 of FIG. 3, the image processing apparatus 101 displays a login screen 400 provided with a user name input box 401 or a password edit box 402 for requesting a user to input information for authentication such as a user ID or a password, as shown in FIG. 4, on the display 302 to prompt the user to input the information for authentication.

Next, when the user inputs the information for authentication and pushes an OK button 403, the image processing apparatus 101 sends the inputted information for authentication to the authentication server 102 and requests authentication from the authentication server 102 (step S202). If the authentication server 102 determines that the information for authentication inputted by the user is equivalent to stored information for authentication that has been registered in the authentication server 102, i.e., the authentication succeeds (YES to step S203), then the flow proceeds to step S204. Otherwise, if the user is determined to be unregistered in the authentication server 102 from the information for authentication inputted by the user or the password is determined to be incorrect, i.e., the authentication fails (NO to the step S203), then the user is judged not to have the right to use the image processing apparatus 101, hence an error message screen 500 indicating that the authentication fails as shown in FIG. 5 is displayed on the display 302 (step S209), the flow returns to step S201 and the initial login screen 400 is displayed.

In step S204, the CPU 303 determines whether or not the authenticated user is a new user who uses the image processing apparatus 101 for the first time. Specifically, the CPU 303 determines whether or not the user ID inputted in the step S201 has been already stored in a user information storing area in the memory 304 as a user information ID of a registered user. As a result, if the user ID has not been stored in the user information storing area, the CPU 303 determines the user to be a new user who uses the image processing apparatus 101 for the first time. Otherwise, if the user ID has been already stored in the area, the CPU 303 determines the user to be a registered user.

If the CPU 303 determines through the authentication server 102 that the authenticated user is not a new user (NO to the step S204), the flow proceeds to step S208. Otherwise, if the user ID has not been stored in the user information storing area, i.e., the CPU 303 determines the user to be a new user who uses the image processing apparatus 101 for the first time (YES to the step S204), then the CPU 303 determines whether or not a reserved memory area in the memory 304 has a free space to add a user information storing area for the user (step S205). As a result, if the CPU 303 determines that there is no free space, then the CPU 303 displays an error message screen 600 indicating that registration fails as shown in FIG. 6 (step S210) and returns to the initial screen 400. Otherwise, if the CPU 303 determines that there is a free space, it allocates a new user information storing area (step S206).

Next, the CPU 303 stores the user ID as a user information ID to identify the user information storing area in the user information storing area allocated in the step S206, and stores duplicate copy of initial setting information stored in the initial setting information storing area 308 (step S207).

In step S208, the CPU 303 displays a screen (not shown) to set conditions for the image reading process on the display 302, and executes the image reading process under the conditions being set through the screen.

In the step S208, if the CPU 303 determines the user to be a registered user in the step S204, it displays an image reading condition setting screen (not shown) on the display 302. On the image reading condition setting screen, a user can change destination setting information such as a destination of an e-mail or a file storing destination, and scan parameters such as the resolution, the paper size, a reading mode or a surface to be read. Meanwhile, the scan parameters displayed on the image reading condition setting screen are scan parameters being set by the registered user himself when the registered user used the device for the last time, hence the registered user does not need change the scan parameters when the user performs scanning with the same setting.

Then, when the user sets the scan parameters and directs scanning, the image processing apparatus 101 performs image reading process based on the scan parameters being set and sends read image data to a designated destination. The inputted scan parameters are stored as image reading condition information in a user information storing area. This allows the image processing apparatus to store separate scan parameters for a plurality of users, so that the users do not need to again set scan setting identical to that for the previous use, thereby saving efforts.

Also, the destination setting information such as a destination of an e-mail transmission or a file storing destination described above is stored in the user information storing area.

Next, operation procedures will be described when an administrator changes the initial setting information stored in the initial setting information storing area 308 with reference to FIGS. 7 to 9. Until the administrator changes the initial setting information, the initial setting information is default setting information that has been previously stored at the introduction of the scanner.

FIG. 7A is a diagram showing one example of a functional restriction setting screen displayed when the administrator wants to change functional restriction information contained in the initial setting information. FIG. 7B is a diagram showing one example of a functional restriction setting screen when the administrator reduced some functional restrictions from the initial setting. FIG. 8 is a diagram showing one example of a password entry screen for an administrator. FIG. 9 is a diagram showing one example of a task selecting screen for an administrator.

The administrator can change contents of the initial setting information stored in the initial setting information storing area 308. For example, in an image processing apparatus D1 installed in a division in which many of the members are nonpermanent employees and an image processing apparatus D2 installed in a system department in which all of the members are permanent employees, their initial setting information stored in each initial setting information storing area 308 would have to be different from each other. It is because it makes possible to restrict sending e-mails to the outside in order to prevent the leakage of confidential information if nonpermanent employees are registered in the authentication server 102 and permitted to use the image processing apparatus D1.

For example, functional restriction information in the initial setting information is changed through the display of functional restriction setting screen 701 or 702 as shown in FIG. 7A or 7B on an image processing apparatus. The administrator sets or changes items that a user is permitted to operate through the screen at the introduction of the apparatus, so that functional restrictions can be set to commit a right for the user to use or edit various types of address books for sending e-mails.

Figure 8:
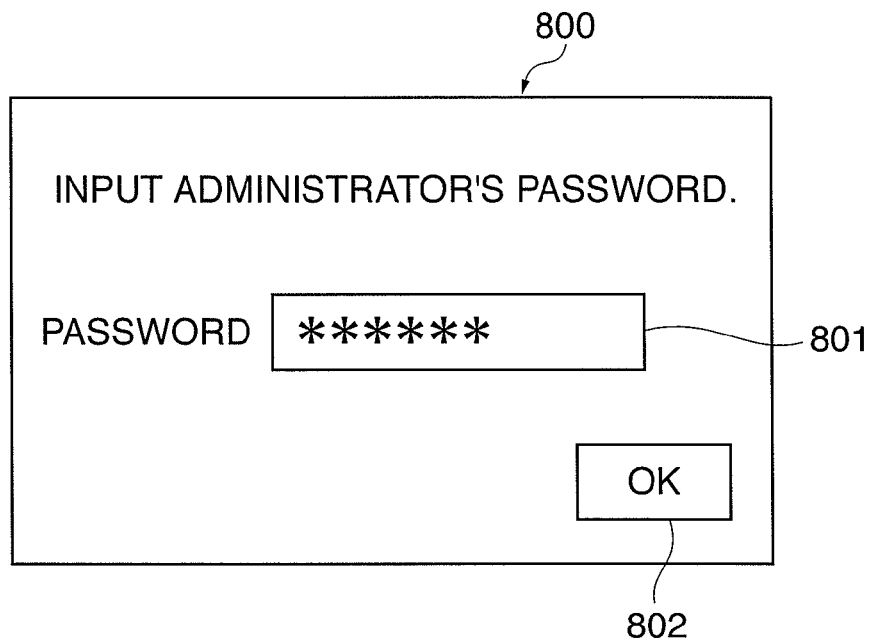
FIG. 8 is a diagram showing one example of a password entry screen for an administrator.
Figure 9:
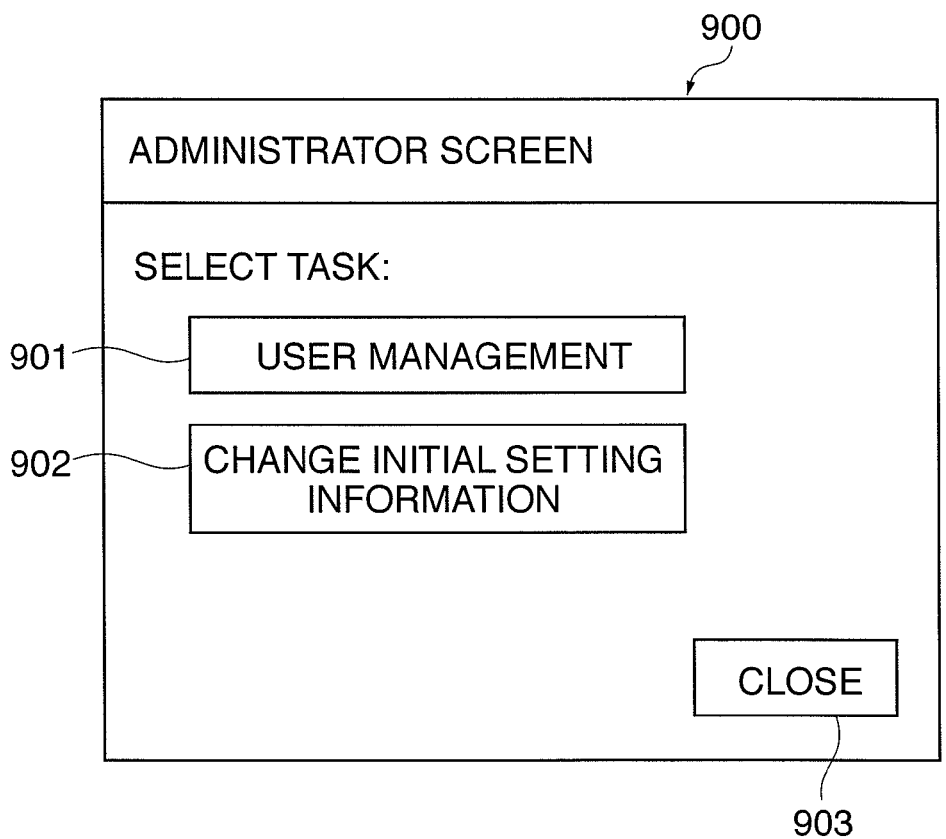
FIG. 9 is a diagram showing one example of a screen for an administrator.

When the administrator changes the initial setting information, the image processing apparatus 101 displays a password entry screen 800 provided with a password edit box 801 as shown in FIG. 8 to request the administrator to input a password. When the administrator inputs the password and pushes an OK button 802, the image processing apparatus 101 checks whether or not the inputted password is for the administrator. If the check succeeds, the image processing apparatus displays an administrator screen 900 as shown in FIG. 9.

The administrator screen 900 displays a user management button 901 to register or delete a user who can use the image processing apparatus 101 or to change functional restriction information for the user, or an initial setting information change button 902 to change the initial setting information stored in the initial setting information storing area 308. When the administrator pushes the initial setting information change button 902, the image processing apparatus 101 displays such a functional restriction setting screen as 701 or 702. When the administrator pushes down a close button 903, the display of the administrator screen 900 ends.

In the functional restriction setting screens 701 and 702, an address book A is an address book in which only internal addresses are registered, while an address book B is an address book in which addresses including external addresses are registered. In order to perform initial setting of the image processing apparatus D1 installed in a division in which many of the members are nonpermanent employees, the administrator previously changes initial setting information as shown in the functional restriction setting screen 702, for example. Afterward, the administrator registers users if necessary.

If a user who has not been registered in the image processing apparatus 101 by the administrator logs in and has authenticated by the authentication server 102, duplicate copy of initial setting information changed as such is stored in a user information storing area.

On the image processing apparatus D1 on which functional restrictions are increased by changing the initial setting information as such, a user can only use the address book A permitted by the administrator to use and can send e-mails only to internal addresses.

In order to perform initial setting of the image processing apparatus D2 installed in a system department of permanent employees only, the administrator previously changes initial setting information as shown in the functional restriction setting screen 701, for example. Afterward, the administrator registers users if necessary. On the image processing apparatus D2 of which functional restrictions are reduced as above, a user can use the address book A and the address book B permitted by the administrator to use, and can send e-mails to addresses including external addresses.

In the above case, a user in the system department is also authorized to edit the address book A and the address book B, so that the user can also change addresses registered in the address book A and the address book B. If the system department includes another authorized user, the administrator separately changes functional restriction information stored in a user information storing area for each user in a similar way, so that the administrator can set different functional restrictions for the respective users as desired.

According to the present embodiment, when user authentication is performed on the authentication server 102 and an authenticated user uses the image processing apparatus 101 for the first time, duplicate copy of the initial setting information stored in the initial setting information storing area 308 is stored as user unique setting information in a user information storing area. As a result, when an authenticated user uses the image processing apparatus 101 for the first time, the user can readily use the image processing apparatus 101 using the initial setting information previously stored or previously set by the administrator only by logging in without laborsome scan setting. Such a user can only use functions permitted to all users based on the initial setting information.

When an authenticated user uses the image processing apparatus 101 for the first time, the image processing apparatus 101 allocate a user information storing area being a user management area for the user, and stores duplicate copy of the initial setting information, which has been previously stored in the initial setting information storing area 308 in the memory 304, in the user information storing area. As a result, it is not necessary to previously reserve a storing area to be wasted for the user who has not used the image processing apparatus 101 yet, thereby efficiently using the memory.

Additionally, the user unique setting information stored in the user information storing area can be changed as desired. As a result, the administrator can change the functional restriction setting for each user, so that the administrator can also impose different functional restrictions on users with different rights.

Moreover, the administrator can change the initial setting information stored in the initial setting information storing area. As a result, the administrator can store scan parameters changed according to scan parameters commonly used by numerous users in the image processing apparatus, hence the administrator can store duplicate copy of the scan parameters when the administrator registers users upon request, and does not need to again set user unique setting information for each user from the initial state, thereby saving efforts.

In the system in FIG. 1, if ten thousands of users have been registered in the authentication server 102 (e.g., in Microsoft Active Directory) and about ten users among them use the single image processing apparatus 101, for example, then the users are fundamentally prohibited from using predetermined functions "a" and "b" of the image processing apparatus 101 in order to set a high security level for the users registered in the authentication server 102 (e.g., in Microsoft Active Directory). As a result, if the users registered in the authentication server 102 log in, the users can use the image processing apparatus 101 with the restriction that they cannot use the functions "a" and "b".

A user "A" registered in the authentication server 102 (e.g., in Microsoft Active Directory) may be permitted to use the function "a". In this case, if the image processing apparatus can retain only functional restriction setting, it is not possible to permit only the user "A" to use the function "a".

However, in the image processing apparatus 101 according to the present embodiment, the administrator can change the functional restriction setting in the user unique setting information. As such, when the user "A" logs in for the first time, functional restriction setting to prohibit from using the functions "a" and "b" is stored. However, it is possible to ask the administrator to change the functional restriction setting so as to permit the user "A" to use the function "a", for example. Such change of the functional restriction setting allows the image processing apparatus to reduce the functional restrictions as requested to administrator by individual users.

Although the user authentication using an ID and a password as information for authentication has been described in the present embodiment, the present invention is not limited to it. However, the user authentication can use biometrics authentication using a fingerprint, an iris, a voiceprint, a palm print, a signed deed, a retina, an equal pulse, a face and the like.

The initial setting information stored in the initial setting information storing area 308 can also be duplicated in a user information storing area when a registered user changes setting such as scan parameters of the image processing apparatus 101 for the first time. In that case, the image processing apparatus 101 reads an image for the user based on the initial setting information of the image reading condition information or the functional restriction information stored in the initial setting information storing area 308 till the setting such as scan parameters of the image processing apparatus 101 is changed by the user. Also, in the present embodiment, the initial setting information storing area 308 and the user information storing area 305 are reserved and allocated in the memory 304, but the present invention is not limited to it. However, part or all of the areas can also be reserved in other storage devices or storage media such as a hard disk.

In addition to requesting user authentication to the authentication server 102, user authentication by registering information for authentication of, for example, dozens of users in the image processing apparatus 101, and by determining whether or not information for authentication inputted by a user on the initial screen 400 matches the information for authentication registered in the image processing apparatus 101 can also be used together. Additionally, a user can also perform user authentication by selecting either one of the authentication server 102 or the image processing apparatus 101.

The present invention also includes a case in which a host device such as a PC connected to the image processing apparatus is also connected to a network so that an authentication server performs user authentication via the network. The image processing apparatus according to the present embodiment can be any image processing apparatus, for example, an image forming device such as a copier, a printer, a facsimile or a multifunction peripheral instead of an image reading device such as the above described scanner.

Figure 10:
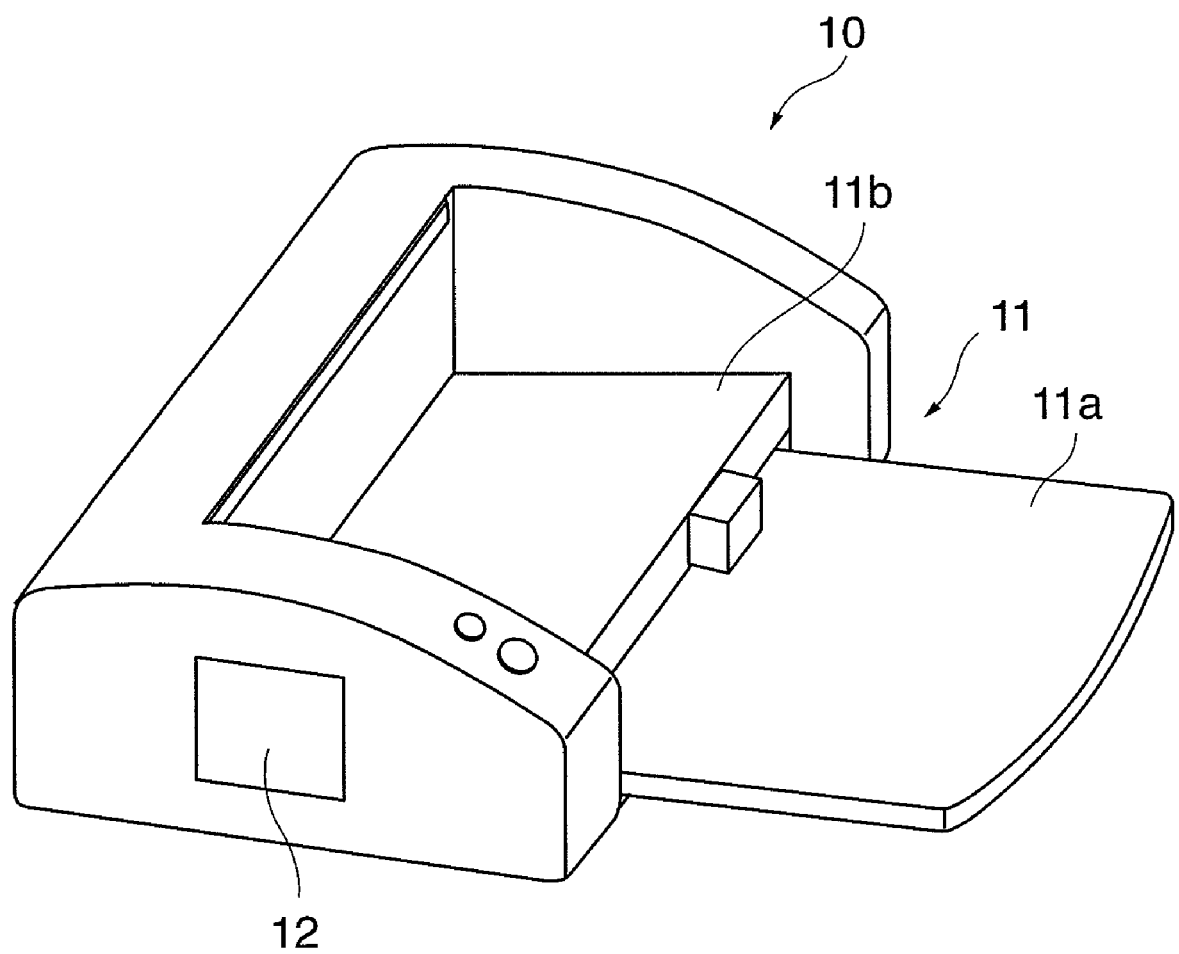
FIG. 10 is a perspective view schematically showing an external view of a scanner as an image processing apparatus according to a second embodiment of the present invention.

FIG. 10 is a perspective view schematically showing an external view of an image processing apparatus according to a second embodiment of the present invention. In a system comprising the image processing apparatus according to the present embodiment, components other than the image processing apparatus are same as those of the system according to the above first embodiment, and therefore description thereof will be omitted.

As shown in FIG. 10, a scanner 10 as an image processing apparatus is configured to perform scan operation to read an image of a conveyed original. The scanner 10 is comprised of a sheet-fed reading portion 11 for reading (scanning) the image of the conveyed original and a touch screen 12 functioning as a GUI.

The sheet-fed reading portion 11 includes an original mounting table 11a on which an original is mounted and an sheet discharging section 11b for ejecting the already read original, as shown in FIG. 10. The sheet-fed reading portion 11 further includes a motor (not shown) for feeding the original mounted on the original mounting table 11a and an image sensor (not shown) for reading the image of the original and obtaining the image as image data.

Figure 11:
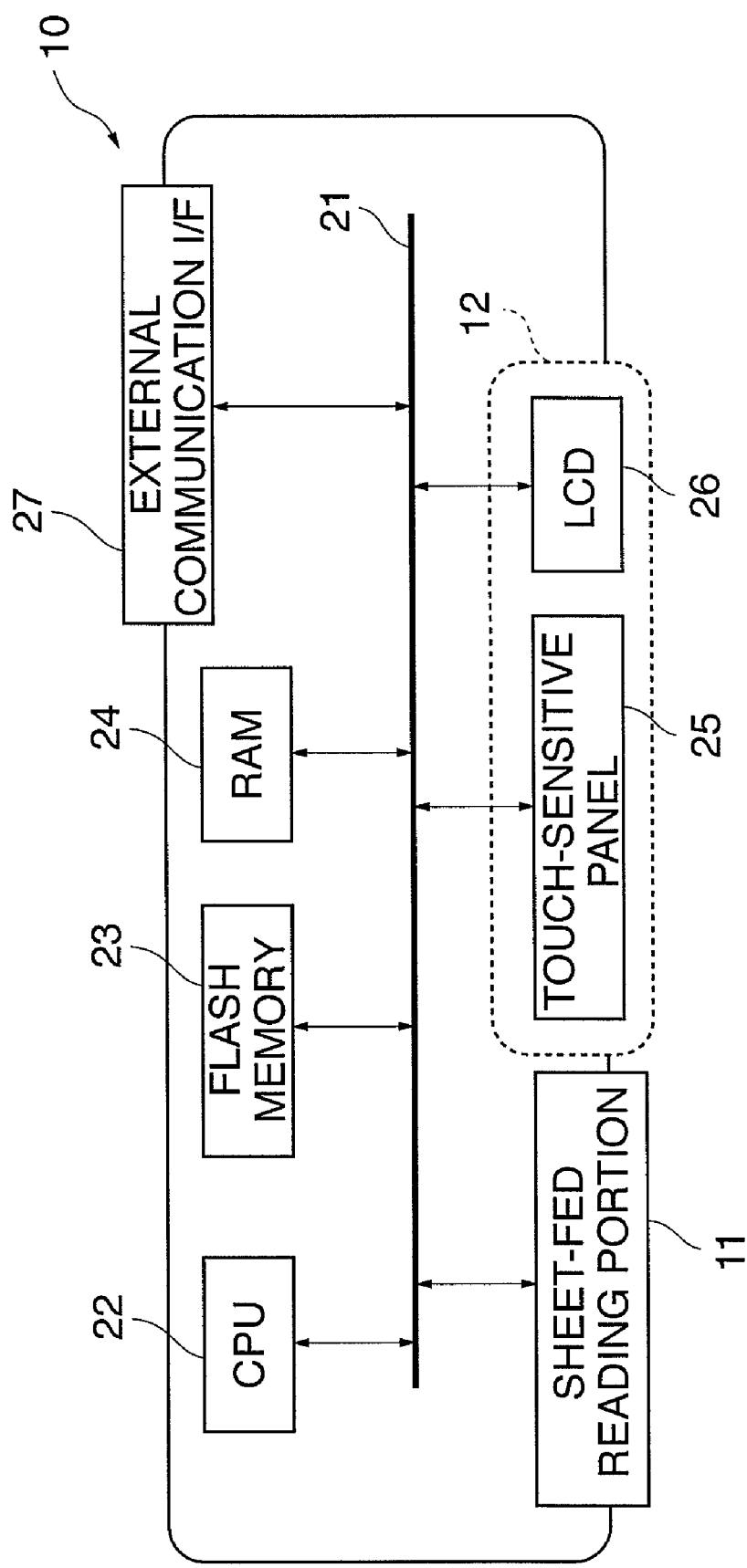
FIG. 11 is a block diagram showing configuration of the scanner in FIG. 10.

FIG. 11 is a block diagram showing configuration of the scanner in FIG. 10.

In FIG. 11, the scanner 10 is comprised of a system bus 21 for information transfer, a CPU 22 connected to the system bus 21, a flash memory 23 as a non-volatile storage medium and a RAM 24.

The CPU 22 executes process to direct the sheet-fed reading portion 11 to perform the scan operation, user management mode switching process in FIG. 17 described later and the like.

The flash memory 23 stores programs that run on the CPU 22 for execution of various process and various types of information. The RAM 24 temporarily holds obtained image data, various types of data, programs and the like. The information stored in the flash memory 23 includes: operation mode information to identify whether an operation mode of the scanner 10 is a user management mode for authenticated users in which user authentication is required, or a non-management mode for every user (non-authenticated users) in which user authentication is not required, read setting (scan setting) information of the scan operation by the sheet-fed reading portion 11, and the like.

The system bus 21 connects to the sheet-fed reading portion 11, a touch-sensitive panel 25 and an LCD 26 constituting the touch screen 12 in FIG. 10, and an external communication I/F 27, as shown in FIG. 11. On the touch screen 12, the LCD 26 displays an operation screen through a GUI, while the transparent touch-sensitive panel 25 accepts a user operation inputted via the operation screen through the GUI. The external communication I/F 27 can send the image data obtained based on an output of the image sensor to other personal computers (PCs), servers and the like. According to the present embodiment, the external communication I/F 27 is connected to at least an authentication server (not shown) that performs user authentication based on information inputted by a user via a login screen 30 in FIG. 12 described later.

The sheet-fed reading portion 11 is controlled by the CPU 22 to perform the scan operation and store the obtained image data of the original in the RAM 24.

Scan parameters are set via an operation screen through a GUI shown in FIGS. 12 to 16 when the sheet-fed reading portion 11 reads the image of the original. Items of the scan parameters include the resolution, brightness, contrast and the like. The scan parameters can be different for respective users. Different scan parameters desired by respective users may also be stored as user-specific data in the flash memory 23. Furthermore, data of the scan parameters stored in the flash memory 23 may be sent as user-specific data to the above authentication server and the like via the external communication I/F 27.

The scanner 10 retains data being common to every user and user-specific data. The scanner 10 has, as its operation modes, a non-management mode for every user in which user authentication is not required in use, and a user management mode in which user authentication is required.

In the user management mode, user authentication is required in use and only the authenticated users can use the scanner 10, thereby providing prevention of the use by a non-official user who is not permitted to use the scanner 10 and providing a high security. Meanwhile, in the non-management mode, user authentication is not required and every user can share data such as common destination information, thereby providing usability of the scanner 10.

Therefore, single scanner 10 according to the present embodiment can provide either of a high security or convenience by selection, thereby facilitating introduction task of the device to an office. Additionally, as will be described later, the scanner 10 improves the convenience by copying a shared address book when a mode of the user management is switched.

A scan operation when an operation mode of the scanner 10 is the user management mode will now be described hereinafter.

Figure 12:
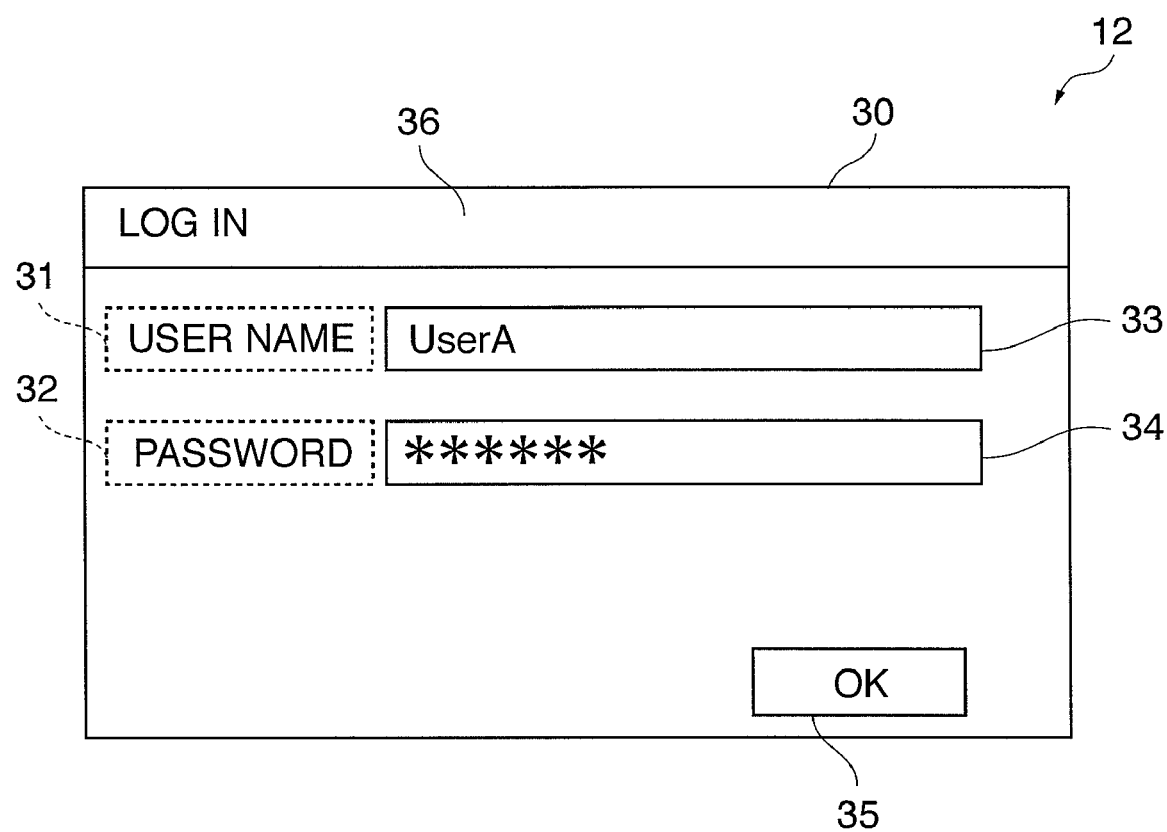
FIG. 12 is a diagram illustrating a login screen displayed on a touch screen if an operation mode of the scanner in FIG. 10 is a user management mode.

FIG. 12 is a diagram illustrating a login screen displayed on a touch screen 12 if an operation mode of the scanner 10 in FIG. 10 is the user management mode. The login screen is displayed immediately after the power of the scanner 10 is switched on, for example.

The login screen 30 shown in FIG. 12 is configured for input of a user name or a password needed to perform user authentication required in the user management mode.

Specifically, a title bar 36 indicating that a screen being currently displayed is a login screen, an edit box 33 to input characters of a user name, an edit box 34 to input characters of a password, and an OK button 35 to define characters inputted in the edit boxes 33 and 34 as determinate designation are arranged on the login screen 30. For example, on the left side of the edit boxes 33 and 34 on the login screen 30, a text display field 31 for displaying a text "user name" indicating that the edit box 33 is a field to input a user name, and a text display field 32 for displaying a text "password" indicating that the edit box 34 is a field to input a password are arranged.

In order to input characters of a user name or a password, a user first taps the surface of the touch-sensitive panel 25 to select one of the edit boxes 33 and 34 to input characters. Subsequently, the user types appropriate characters using a keyboard not shown. The keyboard can be a software keyboard displayed on the LCD 26. In that case, the keyboard can be preferably displayed after the above tapping. When a user name and a password are inputted in the edit boxes 33 and 34 and the OK button 35 is pushed, the user name and the password are sent to the authentication server.

The authentication server performs user authentication depending on the received user name and password, and notifies the scanner 10 of whether or not the user succeeds in the user authentication. If the user authentication is successful, the login screen 30 is switched to a scan setting screen 40 shown in FIG. 13 so that the user can use the scanner 10 and inputs scan parameter, a destination of transmission and the like on the screen 40.

Figure 13:
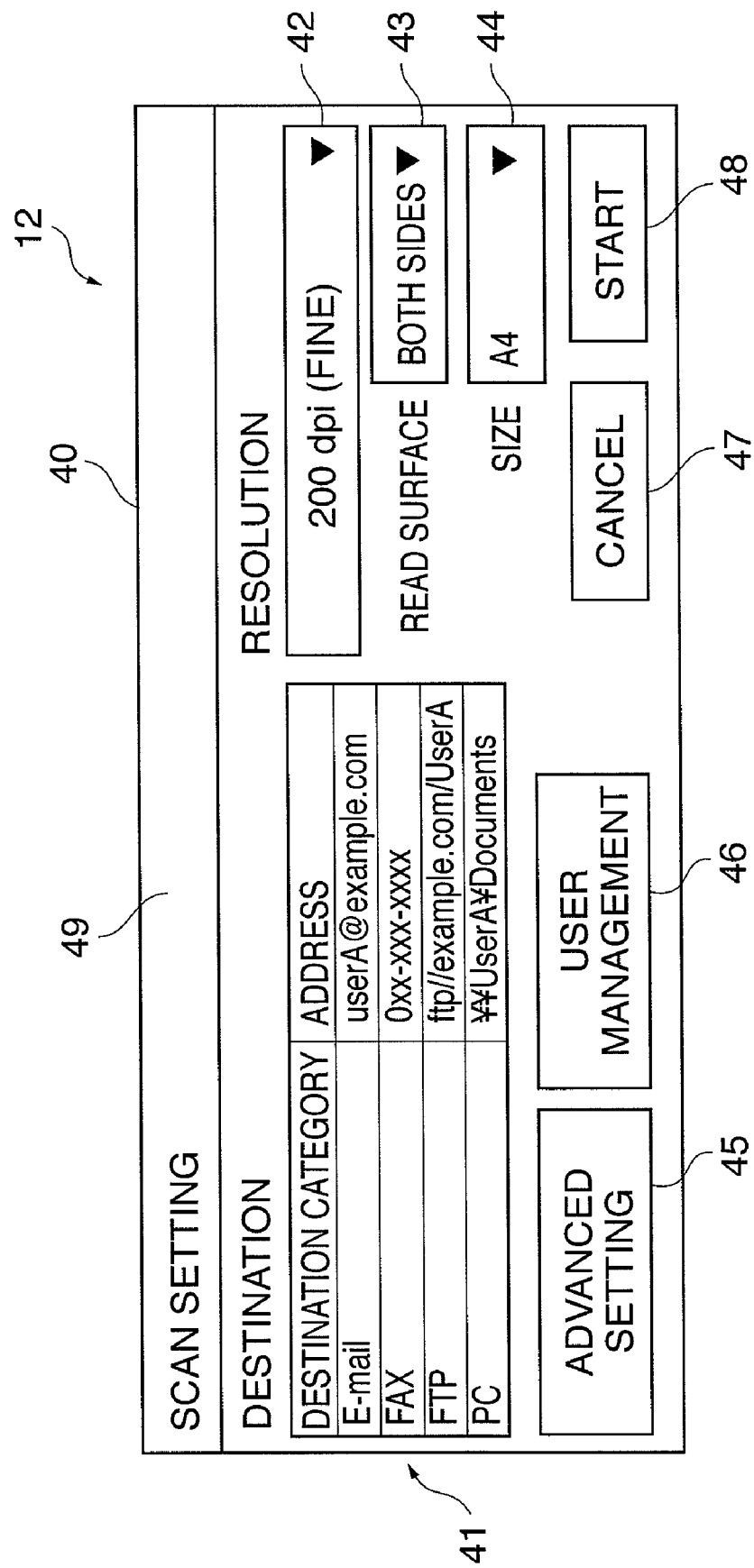
FIG. 13 is a diagram illustrating a scan setting screen displayed on the touch screen in FIG. 10.

FIG. 13 is a diagram illustrating a scan setting screen displayed on the touch screen 12 in FIG. 10. The scan setting screen is displayed only if the user authentication is successful on the login screen 30 in the user management mode.

The scan setting screen 40 shown in FIG. 13 is configured to perform scan parameter setting for a scan operation by the sheet-fed reading portion 11, and to select or input a destination to which image data obtained through the scan operation is sent.

Specifically, on the scan setting screen 40, a title bar 49 indicating that a screen being currently displayed is a scan setting screen, a destination list display area 41 to display a list of designated destinations of the image data transmission, list boxes 42, 43 and 44 for changing of set values of the scan parameter, an advanced setting button 45, a user management button 46, a cancel button 47 and a start button 48 are arranged.

In the destination list display area 41, a list of destinations of the image data being set using destination designation screens 50 and 60 in FIGS. 14 and 15 described later are displayed, in which the category and an address (including a FAX number or the like) are associated with each other. Using the list, a user can readily confirm destinations of the image data transmission. The user taps the destination list display area 41 so that the scan setting screen 40 is switched to the destination designation screen 50 in FIG. 14 described later.

The list box 42 is configured for designating a desired resolution to read an image of an original from a list. The list box 43 is configured for selectively designating that the original is read on a single surface or both surfaces. The list box 44 is configured for designating the paper size or type of the original from a list displaying A4, B5, post card, name card and the like.

The advanced setting button 45 is pushed down to induce transition from the scan setting screen 40 to an advanced setting screen (not shown) for further advanced setting, e.g., selection of image processing.

The user management button 46 is pushed down to display a user management screen 70 in FIG. 16 described later.

The cancel button 47 is pushed down to cancel execution of a scan operation by the sheet-fed reading portion 11 or to cancel the change of scan setting. The start button 48 is pushed down to cause the sheet-fed reading portion 11 to start the execution of the scan operation according to scan parameter being currently set via the scan setting screen 40.

Figure 14:
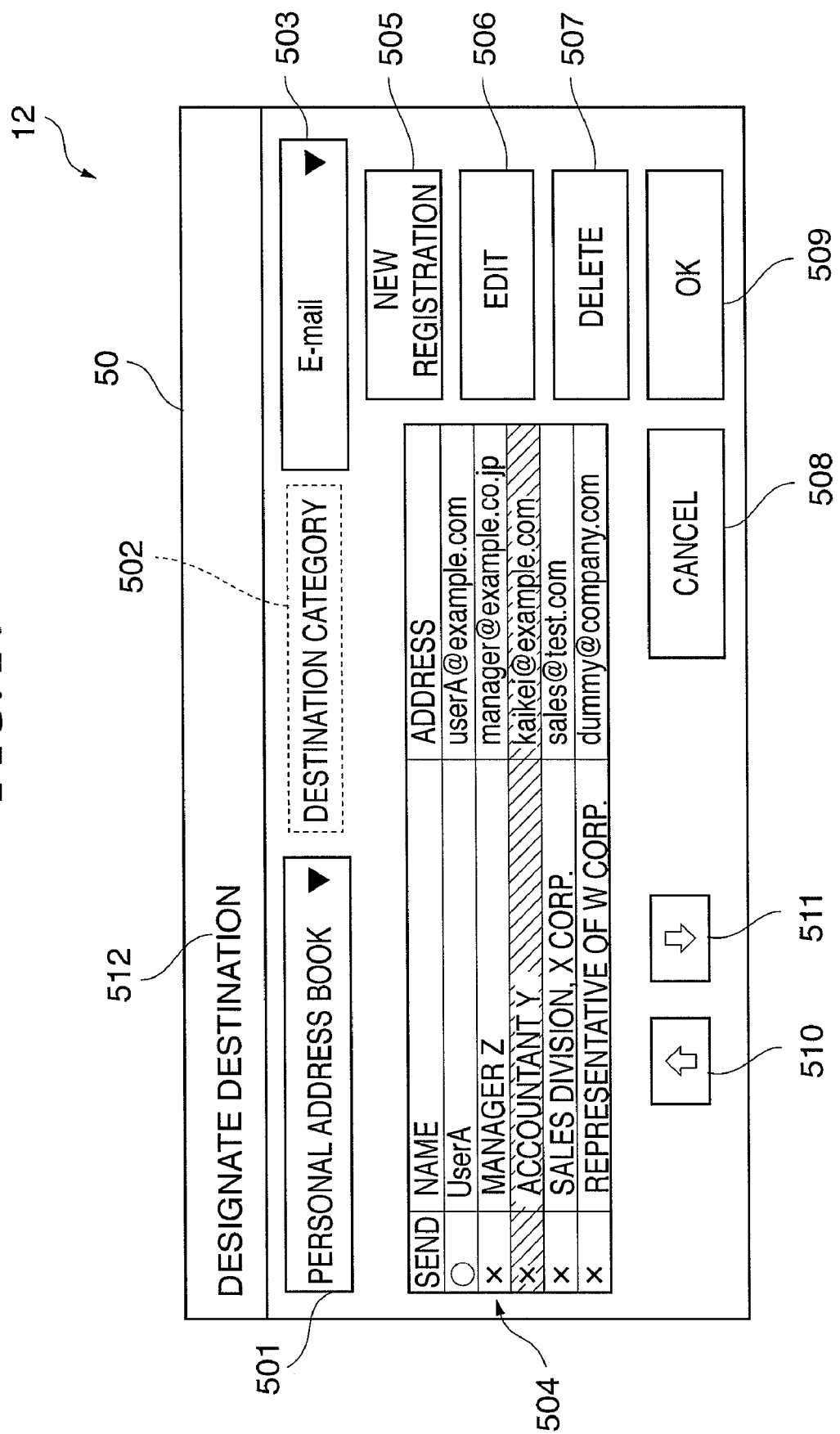
FIG. 14 is a diagram showing a first example of a destination designation screen displayed on the touch screen when a destination list display area in FIG. 13 is tapped.

FIG. 14 is a diagram showing a first example of a destination designation screen displayed on the touch screen 12 when the destination list display area 41 in FIG. 13 is tapped.

A destination designation screen 50 shown in FIG. 14 is not only configured for a user to select a destination of image data transmission, but also configured for the user to edit an address book containing destination data that displayed in an address list display area described later.

Specifically, on the destination designation screen 50, a title bar 512 indicating that a screen being currently displayed is a destination designation screen, list boxes 501 and 503, an address list display area 504, a new registration button 505, an edit button 506, a delete button 507, a cancel button 508, an OK button 509 and up/down buttons 510 and 511 are arranged. For example, on the left side of the list box 503 on the destination designation screen 50, a text display area 502 is provided to display a text "destination category" indicating that the list box 503 is a list box to select a category of a destination.

The list box 501 is configured for selectively designating a desired address book from a plurality of address books. An address book includes a personal address book dedicated to an authenticated user for storing addresses for the authenticated user to send image data to a destination stored in it, and a shared address book that all of the authenticated users can use. There can be a plurality of personal address books dedicated to one authenticated user, and also there can be a plurality of shared address books.

The list box 503 is to selectively designate a desired destination category from a list of kinds of destinations such as E-mail, FTP, a PC, a FAX or a printer.

Display contents of the address list display area 504 change depending on an address book and a destination category selected in the list boxes 501 and 503, as described later in detail. If a shared address book is designated in the list box 501, the destination designation screen 50 is switched to a screen in FIG. 15 described later.

The up/down buttons 510 and 511 are pushed down to select a desired destination from an address book. Each time the buttons are pushed down, display of a destination selected in the address list display area 504 can be scrolled to a corresponding direction on a one-row basis.

The new registration button 505, the edit button 506 and the delete button 507 are pushed down when an address book is edited. The edit of an address book can include new registration of a destination in the address book, edit of information of a destination selected from the address book, and deletion of a destination selected from the address book. More specifically, when the new registration button 505 or the edit button 506 is pushed down, the screen is switched to a destination registration screen (not shown) to register a name or an address as information of a destination. When the delete button 507 is pushed down, a warning dialog (not shown) including a warning message "REALLY DELETE?" is overlapped on the destination designation screen 50.

The cancel button 508 is pushed down to discard all results of edit of an address book and return to the scan setting screen 40. Meanwhile, the OK button 509 is pushed down to store a result of edit of an address book and return to the scan setting screen 40 in the state that destinations selected from the address book are displayed in the destination list display area 41.

Hereinafter, the address list display area 504 will be described in detail.

In the address list display area 504, a list of destinations of a destination category designated in the list box 503, those destinations are registered in an address book designated in the list box 501, is displayed in a table format. In an example shown in FIG. 14, "E-mail" is designated as a destination category, so that only E-mail addresses are extracted from an address book and displayed in the address list display area 504. In this example, if the destination category is changed to an FTP or a FAX using the list box 503, an address book including only extracted addresses or FAX numbers, corresponding to the changed destination category, are displayed on the address list display area 504.

In the address list display area 504, names of destinations of image data transmission, addresses of the destinations, and check information indicating whether or not transmission of the image data to that address is performed.

Specifically, in the address list display area 504, the first column, i.e., a check box column is arranged to display the check information as "o", "x", the second column, i.e., a name display column is arranged to display a name of a destination, and the third column, i.e., an address display column is arranged to display an address of the destination. Meanwhile, in the first row in the address list display area 504, the indices "send", "name" and "address" for each column are displayed, while in the second to sixth rows, part or all of destinations arranged in a predetermined order is displayed.

A display color of a row corresponding to a position tapped by a user in the address list display area 504, for example, display color of the fourth row changes as shown in FIG. 14, which indicates a destination displayed in the row to be in a selected state. If the edit button 506 or the delete button 507 is pushed down while a destination is in a selected state, an address of the destination in a selected state can be edited or deleted. If a user again taps the display part of the destination in a selected state, the destination is set as a destination of image data transmission, which changes display content of the check box column (the first column) from "x" to "o". If the destination has been already set as such destination, the setting can be canceled. For example, if a user again taps a display part of the second row while display content of the check box column is "o" for a destination in the second row, the display content in a cell in the first column can be changed to "x".

Figure 15:
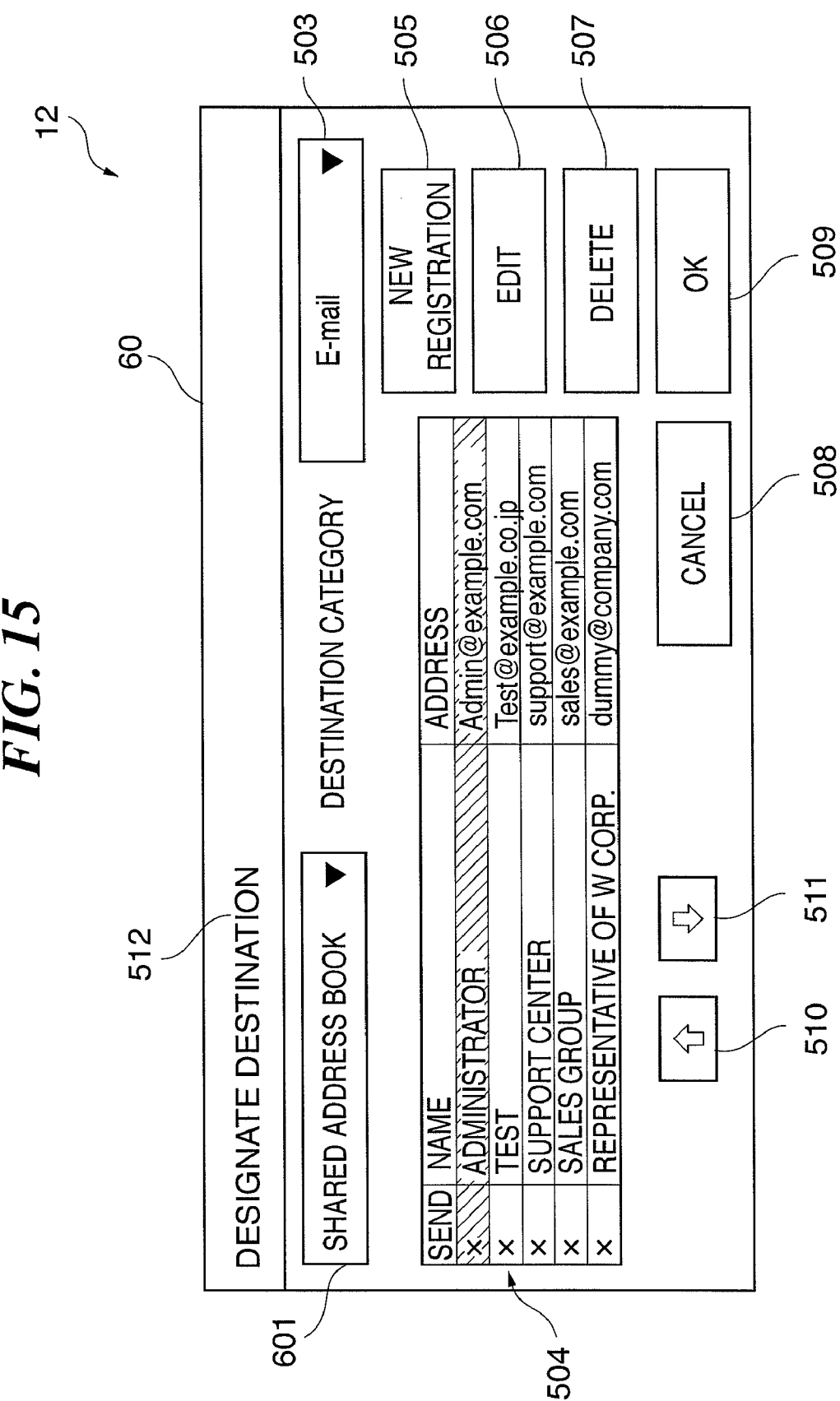
FIG. 15 is a diagram showing a second example of the destination designation screen displayed on the touch screen when a shared address is designated in a list box in FIG. 14.

FIG. 15 is a diagram showing a second example of the destination designation screen displayed on the touch screen 12 when a shared address is designated in the list box 501 in FIG. 14. The destination designation screen is displayed when a shared address book is designated in the list box 501 in FIG. 14, for example. The destination designation screen 60 may also be displayed instead of the destination designation screen 50 in FIG. 14 when a user taps the destination list display area 41 in FIG. 13.

The destination designation screen 60 shown in FIG. 15 is configured similarly to the destination designation screen 50 shown in FIG. 14. Differences are that an address book designated in a list box 601 is a "shared address book" and that an address list display area 604 is arranged instead of the address list display area 504. The address list display area 604 displays a shared address book that can be shared by all users who have logged in through the login screen 30 in FIG. 12.

As shown in FIGS. 14 and 15, a user can readily select and set destinations of image data from the address list display areas 504 and 604. After the selection and setting, when the OK buttons 509 and 609 is pushed down, the destination designation screens 50 and 60 in FIGS. 14 and 15 return to the scan setting screen 40 in FIG. 13. Then, the destination list display area 41 in FIG. 13 displays only addresses of destinations having "o" in the check box columns in the address list display areas 504 and 604 in FIGS. 14 and 15.

Although destinations are selectively set through the list boxes 501, 601 and 503 and tapping by a user in the description relating to FIG. 14 or 15, the present invention is not limited to it. Instead, for example, the scanner 10 can also be configured to set or change destinations using apparatus on a network connected via the external communication I/F 27.

Figure 16:
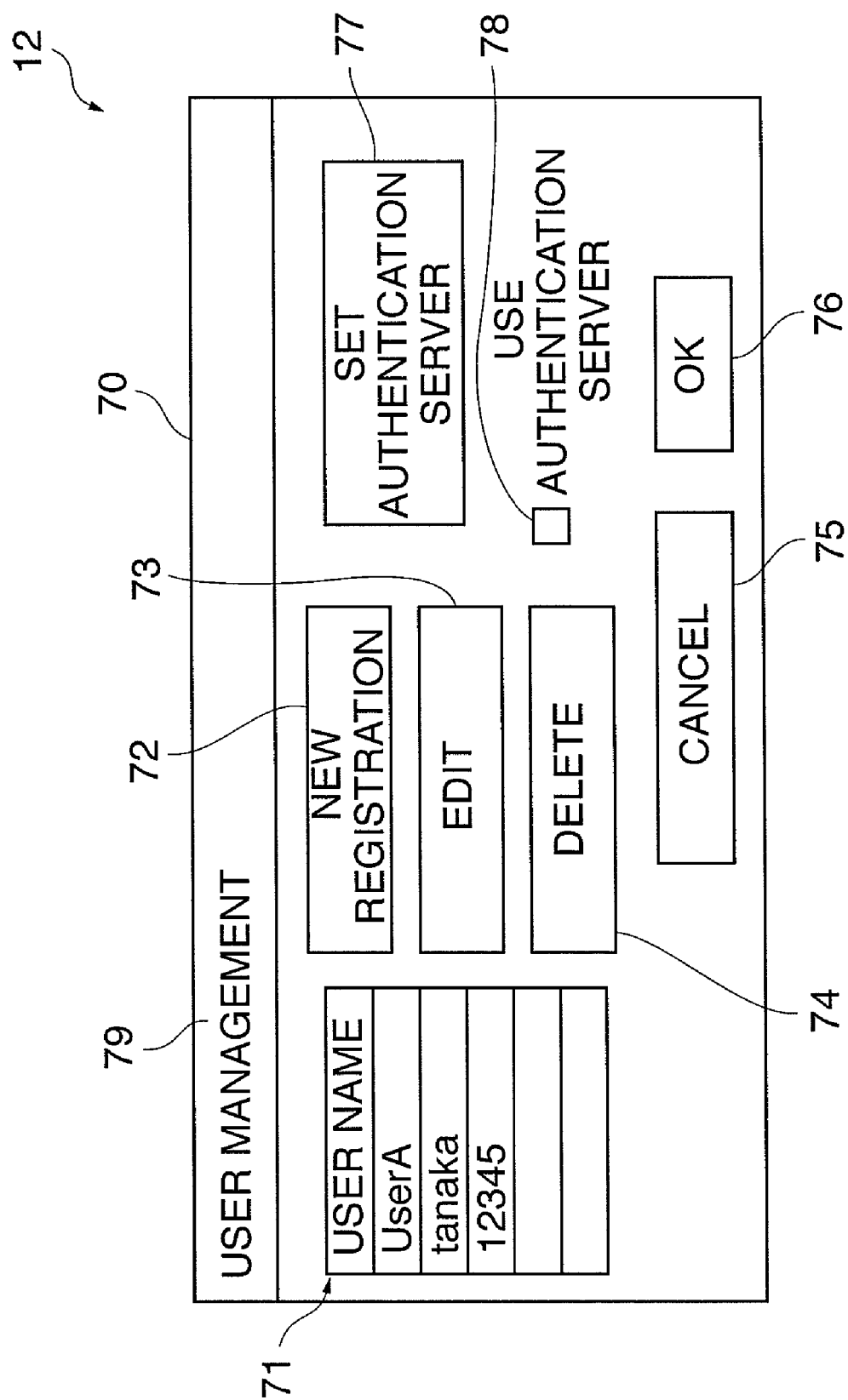
FIG. 16 is a diagram illustrating a user management screen displayed on the touch screen in FIG. 10.

FIG. 16 is a diagram illustrating a user management screen displayed on the touch screen 12 in FIG. 10. The user management screen is displayed when the user management button 46 on the scan setting screen 40 in FIG. 13 is pushed down.

The user management screen 70 (for an administrator of the scanner 10) shown in FIG. 16 is not only configured for the administrator to edit user information such as user names of users who can log in through the login screen 30 in FIG. 12 (registered users), for example, but also configured for the administrator to perform setting of an authentication server.

Specifically, on the user management screen 70, a title bar 79 indicating that a screen being currently displayed is a user management screen, a user name list display area 71, a new registration button 72, an edit button 73, a delete button 74, a cancel button 75, an OK button 76, an authentication server setting button 77 and a check box 78 are arranged. For example, on the right side of the check box 78 on the user management screen 70, a text "use authentication server" is displayed indicating that 78 is a check box to designate whether or not to perform user management on the authentication server.

In the user name list display area 71, a list of user names of registered users is displayed. It is preferred that, if the number of registered users is more than five, for example, up/down buttons are displayed below the user name list display area 71 on the user management screen 70 to scroll registered user names that can be displayed in the user name list display area 71 to a corresponding direction on a one-row basis.

The new registration button 72, the edit button 73 and the delete button 74 are pushed down to edit user information of a registered user. The edit of user information can include new registration of a user name of a new user in the user name list display area 71, edit of user information of a registered user selected from the user name list display area 71, and deletion of the user information of the registered user selected from the user name list display area 71.

More specifically, when the new registration button 72 or the edit button 73 is pushed down, the screen is switched to a user registration screen (not shown) to register a user name or a password as user information. When a new user is registered on the user registration screen, it is preferred that contents of a shared address book can be automatically copied to the personal address book for the new user before the new user edits it. For example, personal address book for newly registered user is automatically created from copied contents of a shared address book. Additionally, the copy can be preferably performed as soon as the new user is newly registered. Therefore, a new user can create his/her own personal address book only by editing a personal address book automatically generated to have identical contents to a shared address book, thereby significantly reducing efforts such as input of an address through a keyboard, hence improving usability of the scanner 10.

When the delete button 74 is pushed down, a warning dialog (not shown) including a warning message "REALLY DELETE?" is overlapped on the user management screen 70. If an approval of the warning message is inputted via the warning dialog, a user name of a registered user selected from the user name list display area 71 is deleted from the list of user names 71, and user information such as an address book, a user name and a password is deleted from the flash memory 23.

The cancel button 75 is pushed down to discard all results of the edit of user registration and return to the scan setting screen 40. Meanwhile, the OK button 76 is pushed down to store the results of the edit of the user registration information and return to the scan setting screen 40.

The authentication server setting button 77 is pushed down to display an authentication server setting screen (not shown) to set a network address of an authentication server for performing user management. The authentication server can be a directory server (e.g., Microsoft Active Directory) provided on a network. Using a directory server, a single authentication server can perform user management for a plurality of scanners 10 in an integrated way. Another user management server (not shown) differing from the authentication server can be added, which can store user information of registered users. In that case, the scanner 10 accesses the user management server via the network to edit the user information.

The check box 78 is checked when the user management is performed by the authentication server being set on the above authentication server setting screen and unchecked when the administration is not performed. This allows administrator to readily switch the use/nonuse of the authentication server. The check box 78 is displayed in gray such that the box 78 cannot be checked when the authentication server is not set on the authentication server setting screen, or when the setting of the authentication server is not valid, or when the setting of the authentication server is valid but the authentication server cannot be connected.

In the present embodiment, if the setting of the authentication server on the authentication server setting screen is valid and the check box 78 is checked, the new registration button 72, the edit button 73 and the delete button 74 are displayed in gray such that the buttons cannot be pushed down. This prevents new registration of a user and edit of user information of a registered user in the scanner 10. If the above user management server is added, the new registration button 72, the edit button 73 and the delete button 74 do not need to be displayed in gray.

It is preferable to display a login screen similar to the login screen 30 in FIG. 12 to check whether or not the administrator is an administrator of the scanner 10 after the user management button 46 in FIG. 13 is pushed down and before the user management screen 70 in FIG. 16 is displayed. On the login screen, a user name, a password of an administrator and the like are inputted. Instead of such a login screen, for example, a password entry screen may be displayed that is created by erasing the edit box 33 and the text display field 31 from the login screen 30 in FIG. 12. Using such password entry screen, an administrator only needs to input a password, but does not need to input a user name.

Next, a scan operation of the scanner 10 which operates in the non-management mode will be described in differences from a scan operation in the user management mode.

If an operation mode of the scanner 10 is the non-management mode, the scan setting screen 40 in FIG. 13 is displayed immediately after the power of the scanner 10 is switched on. As such, the login screen 30 in FIG. 12 is not displayed and no user authentication is performed.

Subsequently, when a user taps the destination list display area 41 on the scan setting screen 40, the scan setting screen 40 is switched to the destination designation screen 60 in FIG. 15. At that time, a shared address book in the list box 601 on the destination designation screen 60 is displayed in gray, hence personal address books other than a shared address book cannot be designated in the list box 601. As such, personal address books dedicated to other authenticated users cannot be viewed, thereby improving security of the scanner 10. If there are a plurality of shared address books, each of the shared address books can preferably be designated in the list box 601.

The user management screen 70 in FIG. 16 may preferably be configured to be displayed only for an administrator of the scanner 10. However, the user management screen 70 in FIG. 16 may also be configured to be displayed for registered users other than the administrator. In that case, the screen 70 can be configured such that registered users other than the administrator cannot edit user information via the user management screen 70.

Figure 17:
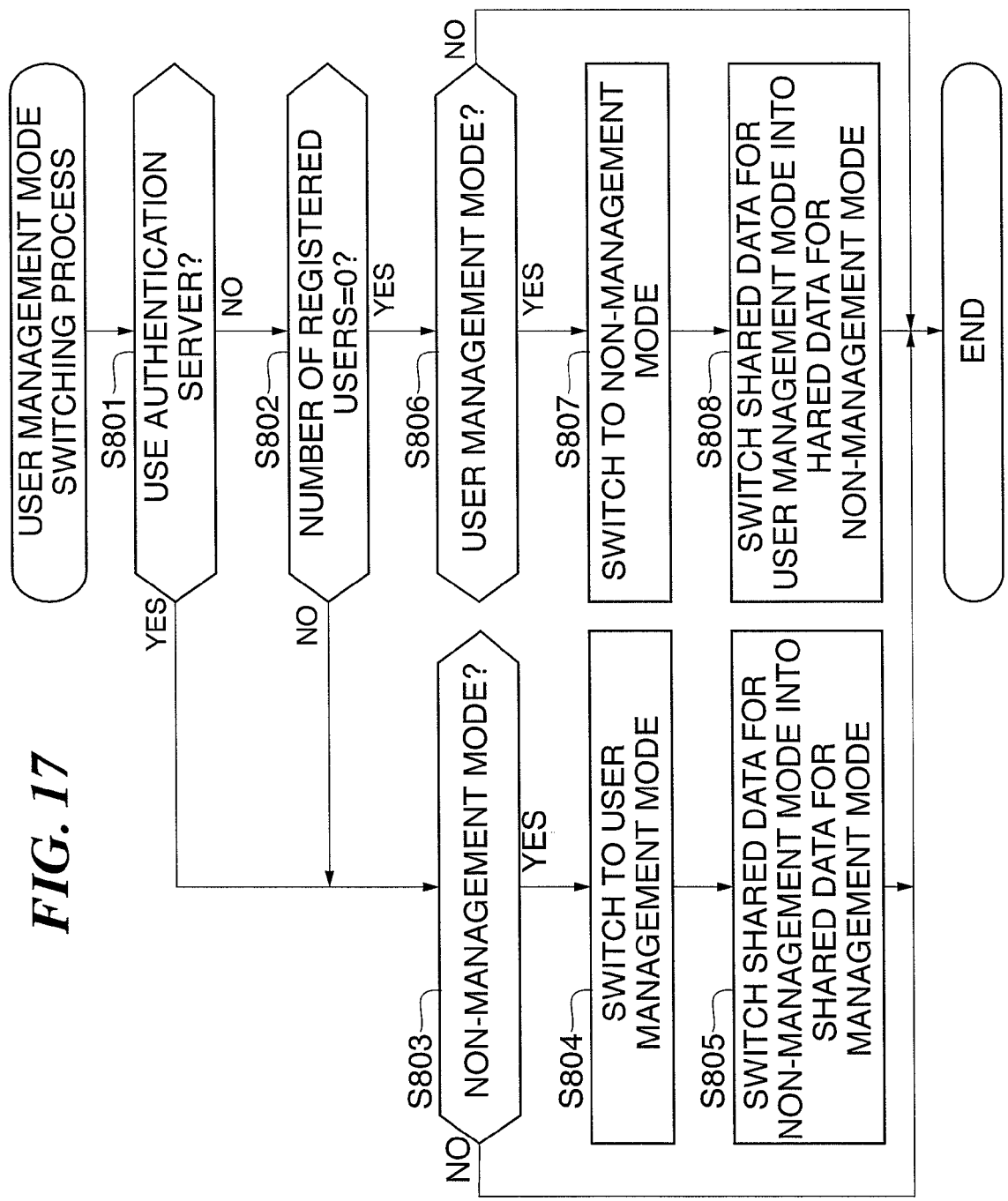
FIG. 17 is a flowchart of a switching process between user management mode and non-management mode executed on the scanner in FIG. 10.

FIG. 17 is a flowchart of a user management mode switching process between user management mode and non-management mode executed on the scanner 10 in FIG. 10. This process is executed by the CPU 22 using the flash memory 23, the RAM 24, the touch-sensitive panel 25, the LCD 26, etc. This process starts when the OK button 76 is pushed down after editing such as new registration of a user or deletion of user information of a registered user on the user management screen 70 shown in FIG. 16, that is, after the number of registered users changes, when the check box 78 is checked or unchecked, or the like.

In FIG. 17, first, it is determined in step S801 whether the authentication server is used or not. Specifically, the CPU 22 determines to use the authentication server if the check box 78 provided on the user management screen 70 shown in FIG. 16 is checked.

If it is determined to use the authentication server (YES to the step S801), it is determined whether or not current operation mode information stored in the flash memory 23 indicates the non-management mode (step S803).

As a result of the determination in the step S803, if the operation mode information represents the non-management mode, an operation mode of the scanner 10 is switched to the user management mode (step S804).

In the user management mode, setting information such as the designation of a destination as described with reference to FIG. 14 or 15 or the scan setting as described with reference to FIG. 13 can be managed for each user. Further, setting information to be administrated can contain information needed to set a PC, a mail server or an FTP server, any one of them can be designated as a destination of transmission.

Subsequently, In step S805, along with the switching to user management mode, data switching of copying shared data (third setting information) such as setting information for the non-management mode currently stored in the flash memory 23 to shared data (second setting information) such as setting information for the user management mode also stored in the flash memory 23.

Figure 18:
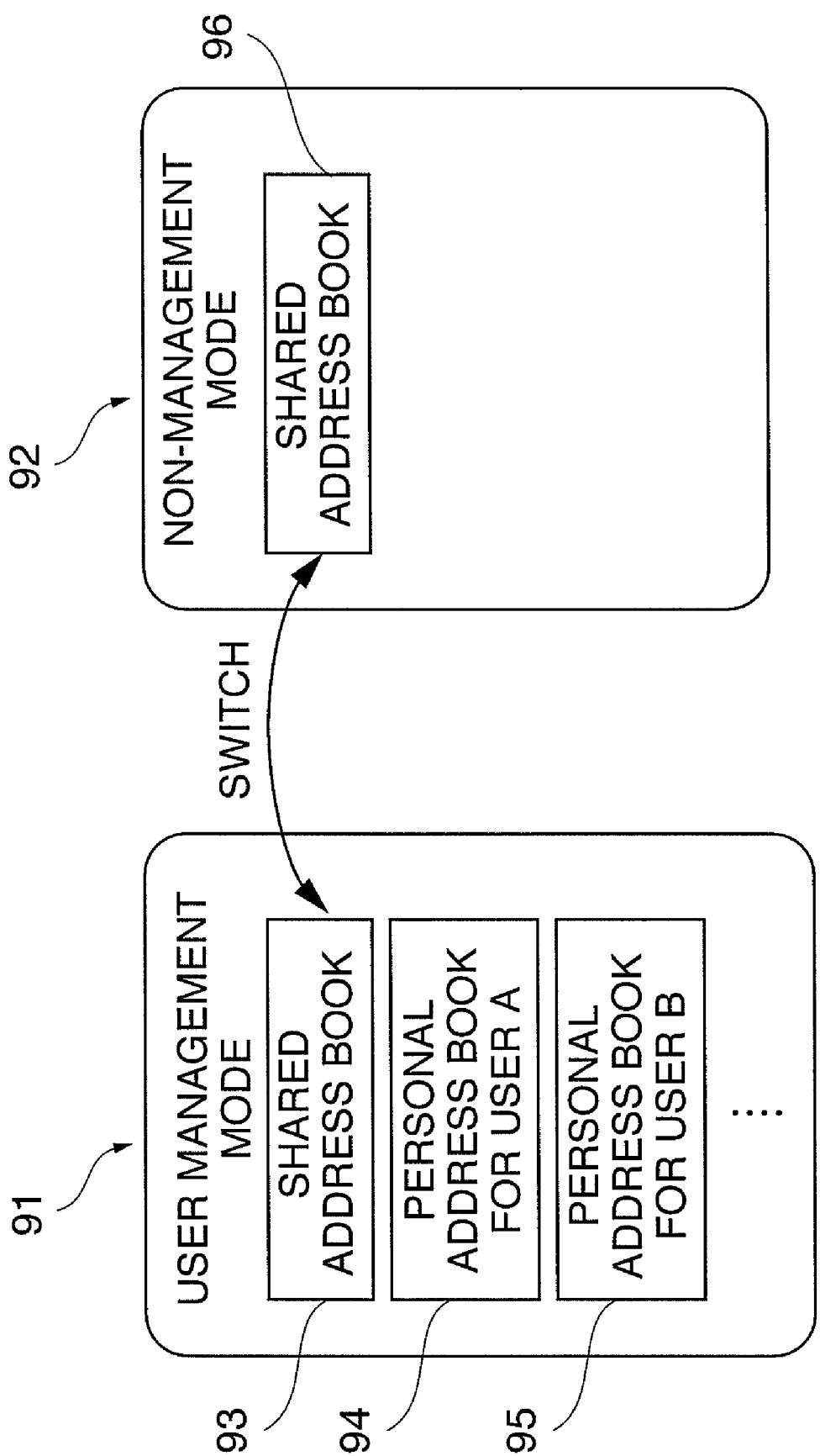
FIG. 18 is a schematic depiction of switching of data in an address book executed in the steps S805 and S808 in FIG. 17.

For example, as shown in FIG. 18, the data switching may be altering the contents of a shared address book that can be shared by authenticated users (registered users) who have logged in through user authentication in the user management mode depending on the contents of a shared address book available to every user in the non-management mode. In other words, data switching is to relate the second setting information to the third setting information. In the present embodiment, the data switching includes process copying the shared address book available to every user into a shared address book available to only registered users. If a personal address book other than the shared address book is stored in the flash memory 23, setting of the destination designation screen 50 is changed such that a registered user can use the personal address book stored for himself/herself (for example, personal address book 94 for the registered user A or personal address book 95 for the registered user B shown in FIG. 18) only if the user selects it.

Otherwise, as a result of the determination in the step S803, if an operation mode information indicates the user management mode, an operation mode of the scanner 10 does not need to be switched, hence the process in steps S804 and S805 is skipped and this user management mode switching process ends.

Meanwhile, as a result of the determination in the step S801, if it is determined not to use the authentication server since the check box 78 is unchecked, then it is determined whether the number of registered users is "0" or not (step S802). As a result of the determination, if the number of registered users is not "0", the flow proceeds to step S803 to cause the scanner 10 to operate in the user management mode. Otherwise, if the number of registered users is "0", the flow proceeds to step S806 to cause the scanner 10 to operate in the non-management mode.

At the next step S806, it is determined whether or not operation mode information stored in the flash memory 23 indicates the user management mode.

As a result of the determination in the step S806, if the operation mode information indicates the user management mode, an operation mode of the scanner 10 is switched to the non-management mode (step S807).

In this non-management mode, it does not need to differently manage setting information required for the destination designation as described with reference to FIG. 14 or 15 or the scan setting as described with reference to FIG. 13 for each user.

Subsequently, in step S808, along with the switching to user management mode, data switching of copying setting information data (second setting information) for the user management mode currently stored in the flash memory 23 to setting information data (third setting information) for the non-management mode. For example, as shown in FIG. 18, data switching may be altering the contents of a shared address book available to every user in the non-management mode depending on the contents of a shared address book available to every user in the user management mode. In other words, data switching is to relate the third setting information to the second setting information. And along with the switching, if the flash memory 23 stores a personal address book other than the shared address book, display of the destination designation screen 50 using the personal address book is prohibited or display setting of the destination designation screen 60 is changed such that the personal address book (for example, the personal address book 94 for the registered user A or the personal address book 95 for the registered user B shown in FIG. 18) cannot be used, since the non-management mode is an operation mode not requiring user authentication. The personal address book can be available by changing an operation mode of the scanner 10 into the user management mode.

Otherwise, as a result of the determination in the step S806, if an operation mode information indicates the non-management mode instead of the user management mode, an operation mode of the scanner 10 does not need to be changed, hence the process in steps S807 and S808 is skipped and this user management mode switching process ends.

According to the process in FIG. 17, for example, when the scanner 10 is introduced to an office, use of an authentication server is not indicated and the number of registered users is "0" (NO to the step S801 and YES to the step S802), hence an operation mode of the scanner 10 is automatically set to the non-management mode (step S807).

When an operation mode of the scanner 10 is changed to the non-management mode, shared data such as scan parameters or a shared address book that is used in the user management mode automatically becomes shared data such as a shared address book available to all users (step S808). This can improve usability of the scanner 10.

Further, not only when the scanner 10 is introduced, but also when the number of registered users becomes "0" due to deletion of a registered user, a mode is changed to the non-management mode, bringing similar advantages.

As described in the above, the usability is improved so that new introduction of the scanner 10 as office equipment to an office can be facilitated.

In the present embodiment, a check box may be arranged to designate whether or not to perform user management on the user management screen 70 in FIG. 16 instead of process in the steps S801 to S802 in FIG. 17. The process in FIG. 17 may be changed such that if this check box is checked, the flow proceeds to step S803; and if the check box is unchecked, the flow proceeds to step S806. In other embodiment, the process in the step S802 can be omitted. In that case, if a result of the determination in the step S801 is NO, the flow proceeds to the step S806.

Either of the switching on shared data executed in the step S805 or S808 in FIG. 17 can be omitted if there is no need.

The process in FIG. 17 can further include process to copy shared address book data 93 (second setting information) to automatically create a personal address book (first setting information) dedicated to a user C when the number of registered users is increased, for example, the user C is newly registered. With this process, it is possible for the user C to edit the personal address book automatically created to readily create his/her own personal address book, and hence the usability is further improved. In this embodiment, the first setting information, the second setting information and the third setting information include a personal address book respectively and apparently have common setting items.

FIG. 18 is a schematic depiction of switching of data in an address book executed in the steps S805 and S808 in FIG. 17.

Although the data such as a personal address book and a shared address book is stored in the flash memory 23 as described above, in other embodiment the data may also be stored in the RAM 24 as necessary. If a storage unit such as a hard disk device is provided, the data may also be stored in the storage unit.

As shown in FIG. 18, data in an address book is stored in an allocated data storing area 91 for the user management mode and an allocated data storing area 92 for the non-management mode separately.

The allocated data storing area 91 for storing user information stores the shared address book data 93 that can be viewed and edited by a registered user during operation in the user management mode, user-specific personal address book data 94 identified by a user name "user A", user-specific personal address book data 95 identified by a user name "user B", and the like.

The allocated data storing area 92 for the non-management mode stores shared address book data 96 that can be shared by every user during operation in the non-management mode.

In the process in the step S805 in FIG. 17 described above, the shared address book data 96 in the data storing area 92 is copied as the shared address book data 93 in the data storing area 91. Meanwhile, in the process in the step S808, the shared address book data 93 in the data storing area 91 is copied as the shared address book data 96 in the data storing area 92.

FIG. 18 shows the example to distinctly store address book data depending on an operation mode of the scanner 10. Similarly, information of the scan setting in FIG. 13 and information of setting in combination of the scan parameter and destination information (job information) can also be distinctly stored depending on an operation mode of the scanner 10.

In the present embodiment, the copying process has been taken as an example of the data switching process, but the present invention is not limited to the copying process. For example, the data switching process may include process to add only information in the second setting information but not contained in the third setting information to the third setting information. The data switching process may also include process to add only information in the third setting information but not contained in the second setting information to the second setting information. In other embodiment just one setting information can be used as the second setting information and also as the third setting information. Further, data storing areas may not be distinguished, so that data to be stored is combined in one group and readable data area may be distinguished depending on an operation mode of the scanner 10. This prevents storing data redundantly, thereby effectively employing data storing areas.

In the present embodiment, all registered users are permitted to edit or view shared data such as the shared address book data 93. However, it may be possible to restrict some users to edit or view the shared data. And also some of the authenticated users may be prohibited to use second setting information.

In the present embodiment, the user management mode implementing a function to improve the security of the scanner 10 has been taken as an example of an operation mode of the scanner 10, but the present invention is not limited to it. However, the present invention can be applied to any operation mode implementing a function requiring switching and managing of setting data for each user.

In the present embodiment, the scanner 10 is comprised of a GUI such as the touch-sensitive panel 25 or the LCD 26 and has a communication function such as a sending function of an E-mail or a FAX or the like. Instead, this invention can be applied on a system in which an image reading device such as the scanner 10 is connected to a host computer such as a PC comprising a GUI and having a communication function.

In the present embodiment, the scanner 10 is containing the sheet-fed reading portion 11. Instead, the scanner 10 can be containing a flatbed scanner. The image processing apparatus according to the present embodiment can be any image processing apparatus, for example, an image forming device such as a copying machine, a printer, a facsimile or a multi function machine instead of an image reading device such as the scanner 10 described above.

It is to be understood that the object of the present invention may also accomplished by supplying a system or an apparatus with a storage medium in which a program code of software which realizes the functions of each of the above described embodiments is stored, and causing a computer (or CPU or MPU) of the system or apparatus to read out and execute the program code stored in the storage medium.

In this case, the program code itself read from the storage medium realizes the functions of each of the above described embodiments, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of each of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of each of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application Nos. 2006-305802 and 2006-337005, filed Nov. 10, 2006 and Dec. 14, 2006, which are hereby incorporated by reference herein in their entirety.

What is claimed is:

1. An image processing apparatus that has a first operation mode in which a user can use the image processing apparatus without authentication and a second operation mode in which authenticated users are allowed to use the image processing apparatus, and can be shared by a plurality of users, comprising:
   a transmission unit constructed to transmit an image data processed by the image processing apparatus;
   a storage unit constructed to store a first address book exclusively used by each authenticated user in the second operation mode, a second address book shared by at least some of the authenticated users in the second operation mode, and a third address book shared by users without authentication in the first operation mode, wherein the first address book, the second address book, and the third address book store therein transmission address of the processed image data to be transmitted by the transmission unit; and
   an address information switching unit constructed to perform switching of transmission address information between the second address book and the third address book when altering a present operation mode to another operation mode
   wherein the address information switching unit is constructed to perform at least one operation of setting of the third address book based on the second address book when the present operation mode is altered to the first operation mode, and of setting of the second address book based on the third address book when the present operation mode is altered to the second operation mode.

2. An image processing apparatus according to claim 1, further comprising an image reading unit constructed to read image data from an original as the processed image data,
   wherein the address information switching unit is constructed to perform at least one address information switching operation of setting the second address book to make equal to the third address book, when the present operation mode is altered to the second operation mode, and of setting the third address book to make equal to the second address book, when the present operation mode is altered to the first operation mode.

3. An image processing apparatus according to claim 2, further comprising a registering unit constructed to perform registration to add a new registered user, and another address information switching unit constructed to perform switching, in which setting of the first address book is performed based on the second address book, the first address book being exclusively used by the new registered user, when the new user is registered by the registering unit.

4. An image processing apparatus according to claim 2, further comprising a mode altering unit constructed to alter the present operation mode depending on whether a user authentication process is performed or not.

5. An image processing apparatus according to claim 3, further comprising a mode altering unit constructed to alter the present operation mode to the first operation mode in case where no registered user exists, and to alter the present operation mode to the second operation mode in case where at least one registered user exists.

6. A control method for controlling an image processing apparatus that has a first operation mode for users without authentication and a second operation mode for authenticated users, and that can be shared by a plurality of users, the control method comprising:
   a transmission step of transmitting image data processed by the image processing apparatus;
   a step of storing a first address book exclusively used by each authenticated user in the second operation mode, a second address book shared by at least some of the authenticated users in the second operation mode, and a third address book shared by users without authentication in the first operation mode, wherein the first address book, the second address book, and the third address book store therein transmission address of the processed image data to be transmitted at the transmission step; and
   an address information switching step of switching transmission address information between the second address book and the third address book when altering a present operation mode to another operation mode
   wherein the address information switching step performs at least one operation of setting of the third address book based on the second address book when the present operation mode is altered to the first operation mode, and of setting of the second address book based on the third address book when the present operation mode is altered to the second operation mode.

7. A non-transitory computer-readable storage medium storing a program for causing a computer to implement a control method for controlling an image processing apparatus that has a first operation mode for users without authentication and a second operation mode for authenticated users, and that can be shared by a plurality of users, the program stored in the storage medium comprising:
- a module that transmits an image data processed by the image processing apparatus;
- a module that performs storing of a first address book exclusively used by each authenticated user in the second operation mode, storing of a second address book shared by at least some of the authenticated users in the second operation mode, and storing of a third address book shared by users without authentication in the first operation mode, wherein the first address book, the second address book, and the third address book store therein transmission address of the processed image data to be transmitted at the transmission step; and
- an address information switching module that switches for transmission address information between the second address book and the third address book when altering a present operation mode to another operation mode;
- wherein the address information switching module performs at least one operation of setting of the third address book based on the second address book when the present operation mode is altered to the first operation mode, and of setting of the second address book based on the third address book when the present operation mode is altered to the second operation mode.

* * * * *